(12) United States Patent
Choi et al.

(10) Patent No.: US 9,785,288 B2
(45) Date of Patent: Oct. 10, 2017

(54) TOUCH SCREEN APPARATUS AND CONTROL METHOD THEREOF

(71) Applicant: SAMSUNG ELECTRONICS CO., LTD., Suwon-si (KR)

(72) Inventors: Sung-do Choi, Suwon-si (KR); Jae-hyeon Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/994,369

(22) Filed: Jan. 13, 2016

(65) Prior Publication Data
US 2016/0357279 A1    Dec. 8, 2016

Related U.S. Application Data

(60) Provisional application No. 62/169,783, filed on Jun. 2, 2015.

(30) Foreign Application Priority Data

Jul. 24, 2015 (KR) .......................... 10-2015-0105136

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01); *G06F 2203/04104* (2013.01)

(58) Field of Classification Search
CPC ......... G06F 2203/04104; G06F 3/0416; G06F 3/043
See application file for complete search history.

(56) References Cited

U.S. PATENT DOCUMENTS

| | | | |
|---|---|---|---|
| 2005/0146513 A1* | 7/2005 | Hill ........................ | G06F 3/043 345/173 |
| 2008/0266266 A1 | 10/2008 | Kent et al. | |
| 2009/0024038 A1 | 1/2009 | Arnold | |
| 2012/0206339 A1* | 8/2012 | Dahl ....................... | G06F 3/043 345/156 |
| 2012/0274609 A1* | 11/2012 | Sheng .................. | G06F 3/0418 345/177 |

(Continued)

FOREIGN PATENT DOCUMENTS

| KR | 10-2012-0069204 A | 6/2012 |
|---|---|---|
| KR | 10-2013-0142354 A | 12/2013 |

OTHER PUBLICATIONS

International Search Report, issued by International Searching Authority in corresponding International Application No. PCT/KR2016/005482, mailed on Aug. 24, 2016, (PCT/ISA/210).

(Continued)

*Primary Examiner* — Dmitriy Bolotin
(74) *Attorney, Agent, or Firm* — Sughrue Mion, PLLC

(57) ABSTRACT

A touch screen apparatus based on an ultrasonic wave is provided. The touch screen apparatus includes a display, ultrasonic sensors, and a processor. The ultrasonic sensors irradiate ultrasonic signals. The processor, in response to the ultrasonic signals being irradiated from the ultrasonic sensors, reflected from an object touched on the display, and received by the ultrasonic sensors, determines a touch point of the object based on Time of Flights (ToFs) of the received ultrasonic signals.

17 Claims, 23 Drawing Sheets

(56) References Cited

U.S. PATENT DOCUMENTS

| | | | |
|---|---|---|---|
| 2013/0093732 A1* | 4/2013 | Esteve | G06F 3/043 |
| | | | 345/177 |
| 2013/0127783 A1 | 5/2013 | Lee | |
| 2013/0234995 A1* | 9/2013 | Son | G06F 3/043 |
| | | | 345/177 |
| 2014/0362055 A1* | 12/2014 | Altekar | G06F 3/0436 |
| | | | 345/177 |
| 2016/0034100 A1* | 2/2016 | Sheng | G06F 3/0436 |
| | | | 345/177 |

OTHER PUBLICATIONS

Written Opinion, issued by International Searching Authority in corresponding International Application No. PCT/KR2016/005482, mailed on Aug. 24, 2016, (PCT/ISA/237).

* cited by examiner

TOUCH SCREEN APPARATUS AND CONTROL METHOD THEREOF

CROSS-REFERENCE TO RELATED APPLICATIONS

This application claims priority from Korean Patent Application No. 10-2015-0105136, filed on Jul. 24, 2015, in the Korean Intellectual Property Office, and the benefit of priority from U.S. Provisional No. 62/169,783, filed on Jun. 2, 2015, in the U.S. Patent and Trademark Office, the disclosures of which are herein incorporated by reference in their entireties.

BACKGROUND

Field

Apparatuses and methods consistent with the present disclosure relate to a touch screen apparatus and a control method thereof, and more particularly, to an ultrasonic touch screen apparatus and a control method thereof.

Description of the Related Art

A touch sensing apparatus, such as a touch screen, a touchpad, or the like, is an input device that is attached to a display apparatus to provide an intuitive input method to a user. The touch sensing apparatus has been widely applied to various types of electronic devices such as a portable phone, a personal digital assistant (PDA), a navigation system, etc. In particular, as demands for smartphones have increased, a ratio of using a touch screen as a touch sensing apparatus capable of providing various input methods in a limited form factor has also increased.

A touch screen applied to a portable device may be realized as a resistive type, a capacitive type, an infrared (IR) type, a surface acoustic wave (SAW) type, etc. according to methods of sensing touch inputs.

As compared to a resistive type, capacitive type, etc. screen, in SAW type touch screen, irradiated ultrasonic waves meet an obstacle, and thus sizes of waves are reduced. Since the SAW type touch screen has a high light penetrability, and high accuracy and definition, the SAW type touch screen has been widely applied mainly to an unmanned information terminal, etc.

However, there are disadvantages to a SAW type touch screen. A related art SAW type touch screen is vulnerable to pollutants on a touch screen surface, and ultrasonic waves are irradiated along the touch screen surface. Therefore, the related art SAW type touch screen has a low recognition performance of a soft touch. Also, the related art SAW type touch screen needs a plurality of acoustic reverberators and additional processing for preventing a ghost touch. Therefore, a design of the related art SAW type touch screen is complicated, and the cost thereof increases.

Therefore, it would be advantageous to have methods of further conveniently increasing a recognition performance of a touch at a low cost.

SUMMARY

Exemplary embodiments overcome the above disadvantages and other disadvantages not described above. Also, exemplary embodiments are not required to overcome the disadvantages described above, and an exemplary embodiment may not overcome any of the disadvantages described above.

It is an aspect to provide a touch screen apparatus that may further accurately measure a touch point by using a Time of Flight (ToF) of an ultrasonic wave, and a control method thereof.

According to an aspect of an exemplary embodiment, there is provided a touch screen apparatus that includes a display; a plurality of ultrasonic sensors configured to irradiate ultrasonic signals; and a processor configured to, in response to the ultrasonic signals being irradiated from the plurality of ultrasonic sensors, reflected from an object touched on the display, and received by the plurality of ultrasonic sensors, determine a touch point of the object based on Time of Flights (ToFs) of the received ultrasonic signals.

In response to ultrasonic signals being respectively irradiated from first and second ultrasonic sensors of the plurality of ultrasonic sensors, reflected from the object, and respectively received by the first and second ultrasonic sensors, the processor may respectively calculate distances from the first and second ultrasonic sensors to the object and determine the touch point of the object based on the calculated distances.

In response to a plurality of objects being touched on the display and an ultrasonic signal being irradiated from the first ultrasonic sensor, refracted from the first object, and received by the second ultrasonic sensor, the processor may remove a ghost touch of the first object by using a ToF of the ultrasonic signal that has been irradiated from the first ultrasonic sensor, refracted from the first object, and received by the second ultrasonic sensor, to determine a touch point of the first object.

The processor may separate an ultrasonic signal, which is reflected from another object except the first object, among the plurality of objects, from an ultrasonic signal received by the first ultrasonic sensor to extract an ultrasonic signal reflected from the first object, extract the ultrasonic signal reflected from the first object from the ultrasonic signal received by the second ultrasonic sensor by using a ToF of the ultrasonic signal that has been irradiated from the first ultrasonic sensor, refracted from the first object, and received by the second ultrasonic sensor, and determine a touch point of the first object based on the extracted ultrasonic signals.

The touch screen apparatus may further comprise a storage configured to store a plurality of reflected waveforms of ultrasonic signals, each reflected waveform corresponding to a distance, wherein the processor compares waveforms of the extracted ultrasonic signals with the stored reflected waveforms to respectively determine distances from the first and second ultrasonic sensors to the first object and determine the touch point of the first object based on the determined distances.

In response to a plurality of objects being touched on the display, and an ultrasonic signal being reflected from a first object of the plurality of objects, and an ultrasonic signal being reflected from a second object of the plurality of objects, wherein the ultrasonic signals overlap each other and then are received, the processor may determine ToFs of the ultrasonic signals respectively reflected from the first and second objects by using at least one of a size of an overlap area where the ultrasonic signals respectively reflected from the first and second objects overlap each other on a waveform of the overlapping ultrasonic signal, and a phase difference between the ultrasonic signals.

The touch screen apparatus may further comprise a storage configured to store reflected waveforms depending on at least one of the size of the overlap area and the phase difference in an ultrasonic signal where the ultrasonic signals respectively reflected from the first and second objects overlap each other, wherein the processor extracts a reflected waveform corresponding to at least one of a peak value and a slope value of the overlapping ultrasonic signal from a candidate group of reflected waveforms corresponding to at least one of the overlap area where the ultrasonic signals respectively reflected from the first and second objects overlap each other and the phase difference, and the processor determines at least one of the size of the overlap area where the ultrasonic signals respectively reflected from the first and second objects overlap each other and the phase difference, based on the extracted reflected waveform.

The processor may calculate ToFs of the received ultrasonic signals to detect outer dots of the object and estimate a size and a shape of the object from the detected outer dots.

The processor may calculate a time that is a time during which an ultrasonic signal is irradiated from a first ultrasonic sensor, refracted from the object, and received by a second ultrasonic sensor, to detect an additional outer dot of the object.

The touch screen apparatus may further comprise a reflector apparatus configured to be provided at an outer part of the display, the reflector apparatus having a paraboloid surface that reflects or refracts a portion of the ultrasonic signals irradiated from the plurality of ultrasonic sensors in a direction substantially parallel to the display.

The touch screen apparatus may further comprise an ultrasonic signal absorbing material configured to absorb at least a portion of other ultrasonic signals except the ultrasonic signals that are reflected or refracted in the direction substantially parallel to the display.

According to another aspect of an exemplary embodiment, there is provided a method of controlling a touch screen apparatus, the method comprising irradiating ultrasonic signals from a plurality of ultrasonic sensors; receiving reflected ultrasonic signals that have been reflected from an object touched on a display, through the plurality of ultrasonic sensors; and determining a touch point of the object based on ToFs of the received ultrasonic signals.

The receiving of the ultrasonic signals may comprise respectively irradiating ultrasonic signals from first and second ultrasonic sensors of the plurality of ultrasonic sensors, and receiving reflected ultrasonic signals that have been reflected from the object, through the first and second ultrasonic sensors, wherein the determining of the touch point of the object may comprise respectively calculating distances from the first and second ultrasonic sensors to the object based on ToFs of the received ultrasonic signals; and determining the touch point of the object based on the calculated distances.

In response to a plurality of objects being touched on the display, and an ultrasonic signal being irradiated from the first ultrasonic sensor, refracted from a first object, and received by the second ultrasonic sensor, a ghost touch point of the first object may be removed by using a ToF of the ultrasonic signal that has been irradiated from the first ultrasonic sensor, refracted from a first object, and received by the second ultrasonic sensor, to determine a touch point of the first object.

The determining of the touch point of the first object may comprise separating an ultrasonic signal, which is reflected from another object other than the first object, from the ultrasonic signal received by the first ultrasonic sensor to extract an ultrasonic signal reflected from the first object, and extracting the ultrasonic signal, which is reflected from the first object, from an ultrasonic signal received by the second ultrasonic sensor by using a ToF of the ultrasonic signal that has been irradiated from the first ultrasonic sensor, refracted from a first object, and received by the second ultrasonic sensor; and determining the touch point of the first object based on the extracted ultrasonic signals.

The method may further comprise storing reflected waveforms of ultrasonic signals, each reflective waveform corresponding to a distance, wherein the determining of the touch point of the first object may comprise comparing waveforms of the extracted ultrasonic signals with the stored reflected waveforms to respectively determine distances from the first and second ultrasonic sensors to the first object; and determining the touch point of the first object based on the determined distances.

The determining of the touch point of the object may comprise, in response to a plurality of objects being touched on the display, and a ultrasonic signal being reflected from a first object of the plurality of objects and an ultrasonic signal being reflected from a second object of the plurality of objects, wherein the ultrasonic signals overlap each other and then are received, determining ToFs of the ultrasonic signals respectively reflected from the first and second objects by using at least one of a size of an overlap area where the ultrasonic signals respectively reflected from the first and second objects overlap each other on a waveform of the overlapping and received signal, and a phase difference between the ultrasonic signals.

The method may further comprise storing reflected waveforms depending on at least one of the size of the overlap area and the phase difference in an ultrasonic signal where the ultrasonic signals respectively reflected from the first and second objects overlap each other, wherein the determining may comprise extracting a reflected waveform corresponding to at least one of a peak value and a slope value of the overlapping ultrasonic signal from a candidate group of reflected waveforms corresponding to at least one of the size of the overlap area where the ultrasonic signals respectively reflected from the first and second objects overlap each other, and the phase difference; and determining at least one of the size of the overlap area where the ultrasonic signals respectively reflected from the first and second objects overlap each other and the phase difference, based on the extracted reflected waveform.

The determining may comprise calculating ToFs of the received ultrasonic signals to detect outer dots of the object; and estimating a size and a shape of the object from the detected outer dots.

The determining may comprise calculating a time that is a time during which an ultrasonic signal is irradiated from a first ultrasonic sensor, refracted from the object, and received by a second ultrasonic sensor, to detect an additional outer dot of the object.

A portion of the ultrasonic signals irradiated from the plurality of ultrasonic sensors may be reflected or refracted from a paraboloid of a reflector apparatus provided at an outer part of the display to be substantially parallel with the display.

Except the ultrasonic signals reflected or refracted from the reflector apparatus to be substantially parallel with the display, at least a portion of other ultrasonic signals may be absorbed by ultrasonic signal absorbing materials that are respectively provided around the plurality of ultrasonic sensors.

According to another aspect of an exemplary embodiment, there is provided a touch screen apparatus comprising a display; a first ultrasonic sensor; a second ultrasonic sensor; and a processor configured to, in response to a first ultrasonic signal being transmitted from the first ultrasonic sensor, reflected from an object touched on the display, and received by the first ultrasonic sensor, and a second ultrasonic signal being transmitted from the second ultrasonic sensor, reflected from the object touched on the display, and received by the second ultrasonic sensor, determine a touch point of the object based on Time of Flights (ToFs) of the received first and second ultrasonic signals.

The processor may calculate a first distance from the first ultrasonic sensor to the object, and a second distance from the second ultrasonic sensor to the object, and determine the touch point of the object based on the calculated first and second distances.

The object may be a first object, and in response to the first object and a second object being touched on the display and an third ultrasonic signal being irradiated from the first ultrasonic sensor, refracted from the first object, and received by the second ultrasonic sensor, the processor may remove a ghost touch of the first object by using a ToF of the third ultrasonic signal.

The processor may separate an ultrasonic signal, which is reflected from the second object, from an ultrasonic signal received by the first ultrasonic sensor to extract the first ultrasonic signal reflected from the first object, extract an ultrasonic signal reflected from the first object from an ultrasonic signal received by the second ultrasonic sensor by using a ToF of the third ultrasonic signal, and determine a touch point of the first object based on the extracted ultrasonic signals.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Figure 1:
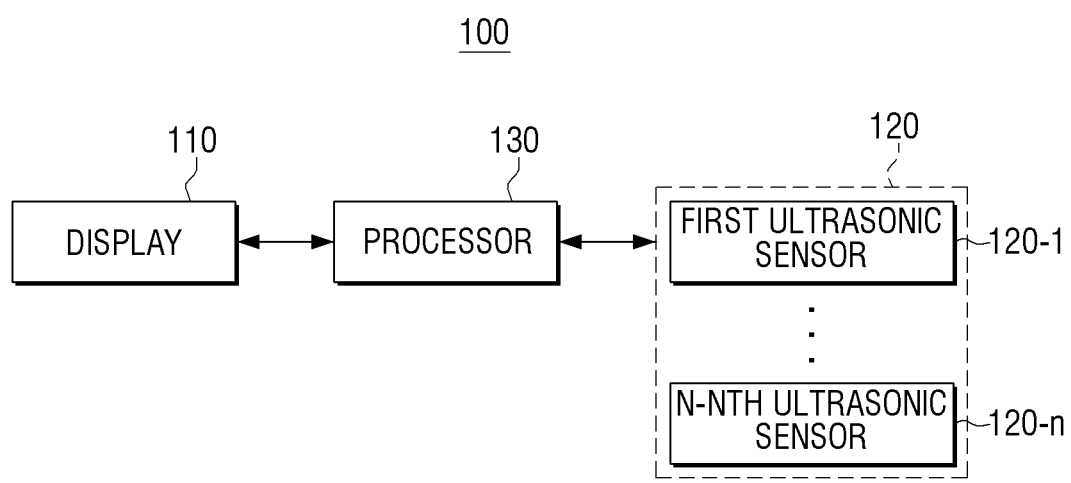
FIG. 1 is a block diagram of a structure of a touch screen apparatus according to an exemplary embodiment.

Certain exemplary embodiments will now be described in detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Thus, it is apparent that the exemplary embodiments can be carried out without those specifically defined matters. Also, well-known functions or constructions are not described in detail since they would obscure the present inventive concept with unnecessary detail.

The exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

FIG. 1 is a block diagram of a structure of a touch screen apparatus 100 according to an exemplary embodiment. The touch screen apparatus 100 refers to an electronic device that may receive a user command through a touch on a display. Examples of the touch screen apparatus 100 may include a smartphone, a camera, a tablet personal computer (PC), a notebook PC, a desktop PC, a media player (an MP3 player or the like), a personal digital assistant (PDA), a game terminal, a wearable device, etc. Also, the touch screen apparatus 100 according to the present exemplary embodiment may also be applied to home appliances (e.g., a refrigerator, a washer, etc.) in which displays are mounted.

Referring to FIG. 1, the touch screen apparatus 100 includes a display 110, a plurality of ultrasonic sensors 120, and a processor 130.

The display 110 is an element that is touched by a user. In detail, the user may touch the display 110 in areas corresponding to various types of contents displayed on the display 110 by using a finger or an electronic pen to input desired information. In other words, the display 110 may be realized as a touch screen that displays contents and simultaneously operates as a touchpad.

The display 110 may be realized as various types of displays such as a liquid crystal display panel (LCDP), an organic light-emitting diode (OLED), a liquid crystal on Silicon (LCoS), digital light processing (DLP), etc. Also, the display 110 may include a driver circuit and may be realized as a type such as an amorphous silicon (a-si) thin film transistor (TFT), a low temperature poly silicon (LTPS) TFT, an organic TFT (OTFT), etc., and a backlight unit, etc.

Here, a glass substrate, a protecting film, etc. that are reinforced to protect the display 110 may be provided on a front surface of the display 110 that is touched.

The plurality of ultrasonic sensors 120 include first through $n^{th}$ ultrasonic sensors 120-1 through 120-n and are elements that irradiate and/or receive ultrasonic signals. The first through $n^{th}$ ultrasonic sensors 120-1 through 120-n are respectively provided on an outer part of the display 110 to irradiate ultrasonic signals and receive ultrasonic signals reflected or refracted from an object to detect distances from the first through $n^{th}$ ultrasonic sensors 120-1 through 120-n to the object and a direction from the first through $n^{th}$ ultrasonic sensors 120-1 through 120-n to the object.

A structure of the first through $n^{th}$ ultrasonic sensors 120-1 through 120-n arranged in the touch screen apparatus 100 and a method of generating an ultrasonic signal irradiated to be parallel with the display 110 will now be described with reference to FIG. 2.

Figure 2:
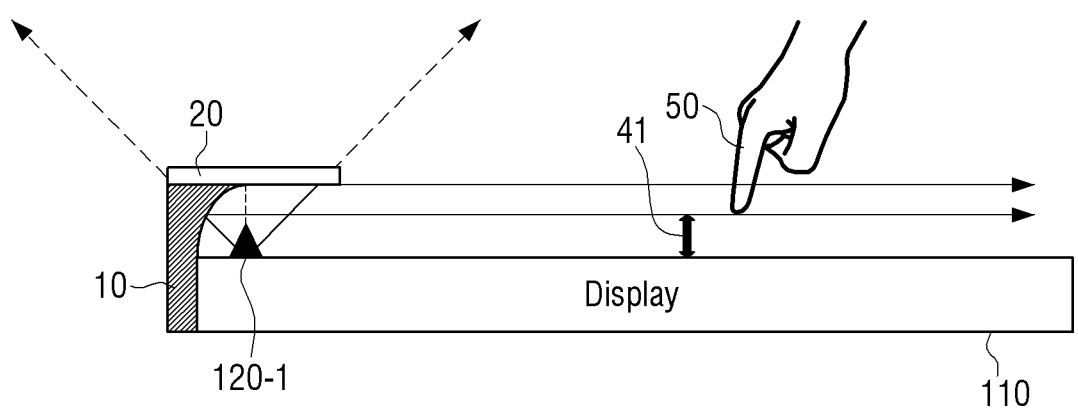
FIG. 2 is a side view of a touch screen apparatus for describing a method of reflecting or refracting an ultrasonic signal irradiated from an ultrasonic sensor to be parallel with a display, according to an exemplary embodiment.

FIG. 2 is a side view of a touch screen apparatus for describing a method of reflecting or refracting an ultrasonic signal irradiated from an ultrasonic sensor to be parallel with a display, according to an exemplary embodiment. For convenience of description, a structure and an operation of the first ultrasonic sensor 120-1 will now be described with reference to FIGS. 2 through 3C. However, the structure and operation of the remaining ultrasonic sensors is the same.

Referring to FIG. 2, the first ultrasonic sensor 120-1 may be positioned around an outer part of the display 110 so as to irradiate ultrasonic waves across and above the display 110. If an object that touches the display 110 is an index finger 50 of the user, the touch screen apparatus 100 may calculate a time that it takes for an ultrasonic signal that is irradiated from the first ultrasonic sensor 120-1 and then reflected from the index finger 50, i.e., a Time of Flight (ToF) of the ultrasonic signal, to detect a distance of the index finger 50 from the first ultrasonic sensor 120-1.

However, since ultrasonic sensors generally irradiate the ultrasonic signal in a range of angles in a 3-dimensional (3D) space, an ultrasonic sensor generally receives signals reflected from multiple sources in such a general case, for example, from the index finger of the user, a thumb of the user, a back of a hand of the user, or another object. Therefore, the touch screen apparatus may not accurately detect a position of a display where the index finger touches the display, as desired.

Therefore, as shown in FIG. 2, in the touch screen apparatus 100 according to an exemplary embodiment, a reflector apparatus 10 may be installed around the first ultrasonic sensor 120-1 to reflect or refract a portion of an ultrasonic signal irradiated from the first ultrasonic sensor 120-1 so as to be parallel with a surface of the display 110.

Here, an inner surface of the reflector apparatus 10 may be realized as a paraboloid shape that is configured to reflect or refract the ultrasonic signal irradiated from the first ultrasonic sensor 120-1 so that the reflected or refracted ultrasonic signal is substantially parallel with the surface of the display 110. The reflector apparatus 10 may be formed of any type of material, such as metal, plastic, etc. that may reflect or refract ultrasonic waves.

The touch screen apparatus 100 may include an ultrasonic signal absorbing material 20 for absorbing an ultrasonic signal, other than the ultrasonic signal that is reflected above the display 110 to be parallel with the surface of the display 110, among ultrasonic signals irradiated from the first ultrasonic sensor 120-1. That is, the ultrasonic signal absorbing material 20 may be provided to absorb parasitic signals. The ultrasonic signal absorbing material 20 may be formed of a material or the like having a high performance of absorbing ultrasonic waves. For example, the ultrasonic signal absorbing material 20 may be formed by using an external opening material such as a texture, felt, or the like or by using a sound-absorbing board or the like if a resonance absorption method is used.

In order to prevent the index finger 50 from being recognized as touching the display 110 even if the index finger 50 approaches and hovers over the display 110, a distance 41 between the display 110 and the ultrasonic signal irradiated to be parallel with the surface of the display 110 may be minimized. Also, a generation of a parasitic signal may be minimized, or a generated parasitic signal may be removed, to minimize a parasitic reflection noise.

Figure 3A:
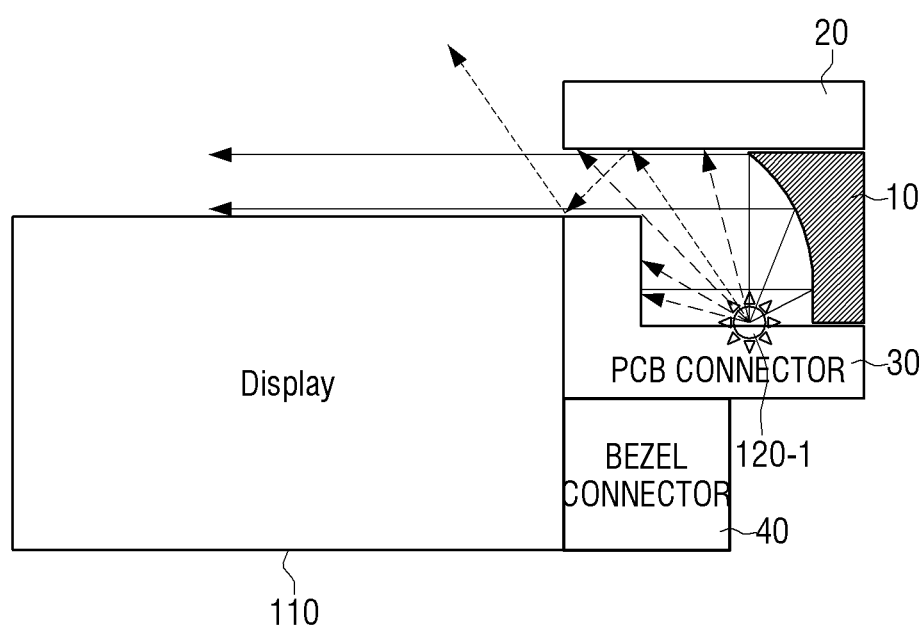
FIGS. 3A through 3C illustrate configurations of an ultrasonic sensor and a reflector apparatus, according to various exemplary embodiments.
Figure 3B:
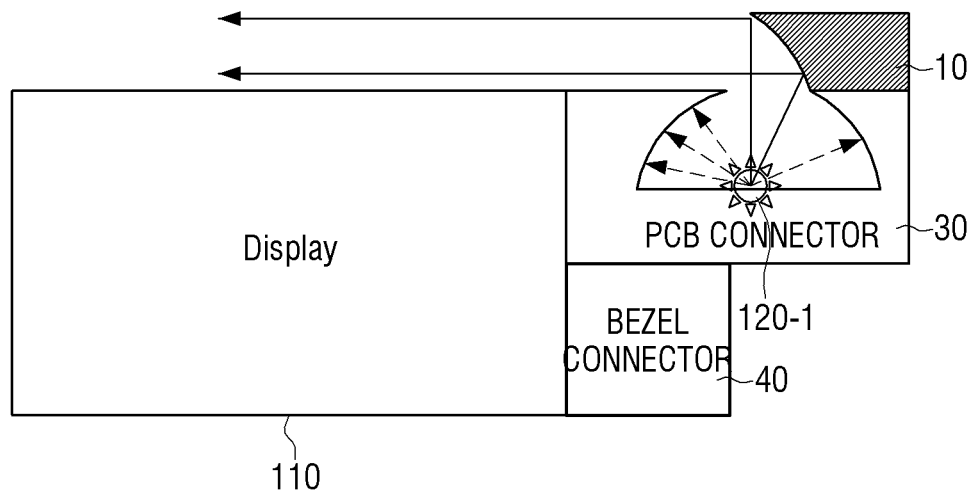
Figure 3C:
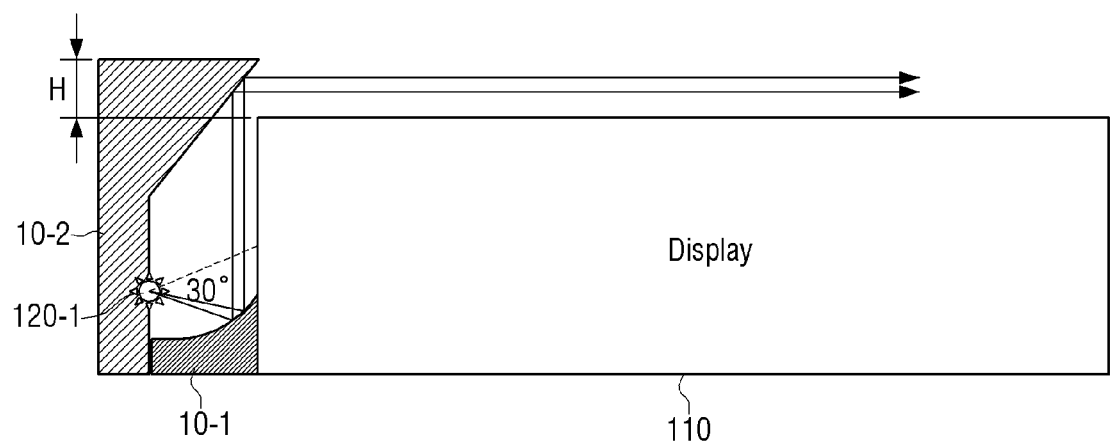

For this, a height and a position of the reflector apparatus 10 and a shape of a paraboloid of the reflector apparatus 10 may be configured to minimize or eliminate parasitic signals. FIGS. 3A through 3C illustrate a configuration of an ultrasonic sensor and a reflector apparatus according to exemplary embodiments.

FIG. 3A illustrates a configuration of the first ultrasonic sensor 120-1 and the reflector apparatus 10 illustrated in FIG. 2. As shown in FIG. 3A, a printed circuit board (PCB) connector 30 may be provided at an outer corner of the display 110 to mechanically and/or electrically connect the display 110 and the reflector apparatus 10 to each other. A bezel connector 40 may be provided under the PCB connector 30 to support the PCB connector 30 and to provide a bezel connecting the display 110 with the reflector apparatus 10. In some exemplary embodiments, the bezel connector 40 may enclose the reflector apparatus 10. The first ultrasonic sensor 120-1 and the reflector apparatus 10 may be combined with each other above the PCB connector 30.

As shown in FIG. 3A, a portion of an ultrasonic signal reflected from the reflector apparatus 10 may be irradiated above the display 110 to be parallel with the display 110. In the exemplary embodiment of FIG. 3A, a portion of the ultrasonic signal that is not reflected from the reflector apparatus 10 may be absorbed by the ultrasonic signal absorbing material 20, or may be reflected by the ultrasonic signal absorbing material in a direction that is not parallel with the surface of the display 110. In this configuration, the reflector apparatus 10 has a simple structure and thus is easily fabricated.

Here, the PCB connector 30 may be realized as a sound-absorbing material that may absorb ultrasonic waves.

FIG. 3B illustrates a configuration of an ultrasonic sensor and a reflector apparatus according to another exemplary embodiment. In the exemplary embodiment of FIG. 3B, an internal space of the PCB connector 30 may be provided in a dome shape with an opening in the upper part, and the reflector apparatus 10 may be provided on an outer surface of the upper part of the PCB connector 30. The first ultrasonic sensor 120-1 may be provided on the PCB connector 30 in the internal space of the PCB connector 30 that is partially enclosed by the dome shape. An internal space of the PCB connector 30 formed by the dome shape may be provided, coated and/or covered with an ultrasonic signal absorbing material.

As shown in FIG. 3B, the touch screen apparatus 100 may be configured so as to enable most of ultrasonic signals irradiated from the first ultrasonic sensor 120-1 to be absorbed or reflected by the PCB connector 30 and thus not to exit from the PCB connector 30. Here, only an ultrasonic signal that is irradiated in a direction to exit the opening in the upper part of the dome shape of the PCB connector 30 may be reflected from the reflector apparatus 10 to be parallel with the surface of the display 110.

In the exemplary embodiment of FIG. 3B, a parasitic signal is reflected from the PCB connector 30 to return to the first ultrasonic sensor 120-1 in a short time. Thus, the time of flight of the parasitic signals may be used to filter out the parasitic signals. Therefore, a parasitic reflection noise may be reduced.

FIG. 3C illustrates a configuration of an ultrasonic sensor and a reflector apparatus according to another exemplary embodiment. In the exemplary embodiment of FIG. 3C, a reflector apparatus 10-1 may be disposed under the surface of the display 110 to be combined with the display 110. Also, a bezel 10-2 may be combined with the reflector apparatus 10-1 on an opposite side to a side of the reflector apparatus 10-1 combined with the display 110.

Here, the bezel 10-2 may have a shape including a reflective surface that may reflect an ultrasonic signal, which has been reflected from the reflector apparatus 10-1 to be irradiated upwards, at an angle of 90° so as to be parallel with the surface of the display 110 above the display 110. In other words, the reflector apparatus 10-1 reflects the ultrasonic signal upwards, and the reflective surface of the bezel 10-2 reflects the ultrasonic signal at an angle of 90° so as to be parallel with the surface of the display 110 above the display 110. Therefore, only an ultrasonic signal that is reflected from the reflector apparatus 10-1 to be reflected from an extremely partial area of the reflective surface of the bezel 10-2 may be irradiated to be parallel with the surface of the display 110 above the display 110.

In the exemplary embodiment of FIG. 3C, a height H of the bezel 10-2 above the top of the surface of the display 110 may be minimized to minimize a distance between the display 110 and an ultrasonic wave irradiated to be parallel with the surface of the display 110. Therefore, a touch misrecognition rate caused by hovering may be reduced.

Returning to FIG. 1, the processor 130 is an element that controls an overall operation of the touch screen apparatus 100.

If ultrasonic signals irradiated from the plurality of ultrasonic sensors 120 are reflected from an object touching the display 110 and then received by the plurality of ultrasonic sensors 120, the processor 130 may determine a touch point of the object based on ToFs of the received ultrasonic signals.

For example, if ultrasonic signals are respectively irradiated from a first ultrasonic sensor and a second ultrasonic sensor and reflected from an object to be respectively received by the first and second ultrasonic sensors, the processor 130 may calculate distances from the first and second ultrasonic sensors to the touch point of the object based on ToFs of the received ultrasonic signals and determine the touch point of the object based on the calculated distances.

A method of determining a touch point of an object will now be described in detail with reference to FIG. 4.

Figure 4:
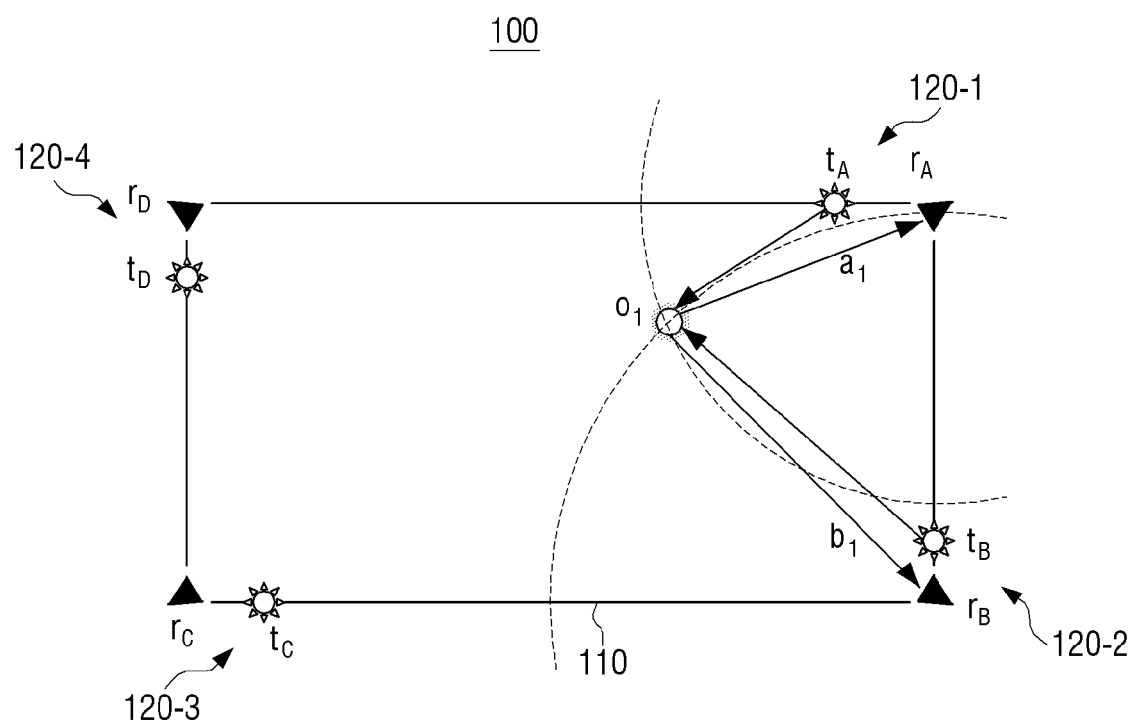
FIG. 4 illustrates a method of determining a touch point of an object according to an exemplary embodiment.

FIG. 4 illustrates a method of determining a touch point of an object according to an exemplary embodiment. An exemplary embodiment where first through fourth ultrasonic sensors 120-1 through 120-4 are respectively provided around corners of the display 110 one by one will now be described. However, the present invention is not limited to the above exemplary embodiment. Therefore, the touch screen apparatus 100 may include two or three ultrasonic sensors in various positions of an outer part of the display 110, or five or more ultrasonic sensors in various positions.

As shown in FIG. 4, if an object $o_1$ is touched on the display 110, the processor 130 may detect a ToF that is a time during which an ultrasonic wave is irradiated from a transmitter $t_A$ of the first ultrasonic sensor 120-1, is reflected from the object $o_1$, and returns to a receiver $r_A$ of the first ultrasonic sensor 120-1. In other words, the ToF is a round trip time from transmission of the ultrasonic wave from the ultrasonic sensor through reception at the ultrasonic sensor of the reflected ultrasonic wave from the object $o_1$. Here, since a speed of the ultrasonic wave is always constant at 340 m/s, the processor 130 may calculate a distance $a_1$ from the first ultrasonic sensor 120-1 to the object $o_1$ based on the detected ToF.

The processor 130 may also detect a ToF that is a time during which an ultrasonic wave is irradiated from a transmitter $t_B$ of the second ultrasonic sensor 120-2, is reflected from the object $o_1$ and then returns to a receiver $r_B$ of the second ultrasonic sensor 120-2. The processor 130 may calculate a distance $b_1$ from the second ultrasonic sensor 120-2 to the object $o_1$ based on the detected ToF.

If the distances $a_1$ and $b_1$ are calculated, a position of the object $o_1$ on the display 110 may be calculated by trigonometry. In other words, if a distance between the first ultrasonic sensor 120-1 and the second ultrasonic sensor 120-2 is assumed as information of a base station in the touch screen apparatus 100, and the distance $a_1$ from the first ultrasonic sensor 120-1 to the object $o_1$ and the distance $b_1$ from the second ultrasonic sensor 120-2 to the object $o_1$ are calculated, three elements (lengths of three sides) of a triangle may be determined, and the processor 130 may determine a position of the object $o_1$ on a 2-dimensional (2D) coordinate of the display 110 by using trigonometry.

As a result, the processor 130 may determine a touch point of the object $o_1$ based on a distance of the object $o_1$ from the first ultrasonic sensor 120-1 and the second ultrasonic sensor 120-2.

As described above, a distance from a minimum of two ultrasonic sensors may be calculated to determine the touch point of the object $o_1$. Here, ultrasonic sensors used for a distance calculation may be variously selected, but an ultrasonic sensor detecting a fastest ToF, i.e., an ultrasonic sensor that is a shortest distance from the object $o_1$, and an ultrasonic sensor close to the ultrasonic sensor may is the shortest distance form the object $o_1$ may be selected to be included. In other words, in FIG. 4 among the four ultrasonic sensors 120-1 to 120-4, the first ultrasonic sensor 120-1 is the shortest distance from the object $o_1$, and is therefore selected to be included, and the second ultrasonic sensor 120-2 is the sensor closest to the first ultrasonic sensor 120-1, and therefore the second ultrasonic sensor 120-2 is also selected to be included.

Ultrasonic signals irradiated from the first through fourth ultrasonic sensors 120-1 through 120-4 may be different signals. For example, ultrasonic signals irradiated from the first ultrasonic sensor 120-1 and the second ultrasonic sensor 120-2 may have different frequencies.

In detail, each ultrasonic sensor may receive an ultrasonic signal that is irradiated from the each ultrasonic sensor, reflected from an object, and received. In other words, an ultrasonic sensor receives not only its own transmitted and reflected signal, but also signals from the other ultrasonic sensors. In such a case, a processor may not be able to accurately measure a distance from an ultrasonic sensor to an object.

Therefore, ultrasonic signals respectively irradiated from ultrasonic sensors may be realized as different signals to separate an ultrasonic signal, which is irradiated from another ultrasonic transmitter and then refracted from the object $o_1$, from an ultrasonic signal transmitted from its own ultrasonic transmitted, reflected, and received.

Alternatively, the processor 130 may perform a time division on ultrasonic signals irradiated from the first ultrasonic sensor 120-1 and the second ultrasonic sensor 120-2 to distinguishably separate ultrasonic signals respectively irradiated from ultrasonic sensors according to time in order to distinguish the signals. In other words, the processor 130 may control the ultrasonic sensors so that first the first ultrasonic sensor 120-1 transmits and receives, and then the second ultrasonic sensor 120-2 transmits and receives, and then the third ultrasonic sensor 120-3 transmits and receives, etc. to cycle through the ultrasonic sensors and thereby avoid interference between the signals. In such a process, the ultrasonic sensors may use the same signals.

Even if a multi-touch is performed on the display 110 through a plurality of objects, the processor 130 may determine the touch point by using the same method as the above-described method. Detailed contents of this will be described with reference to FIG. 5.

Figure 5:
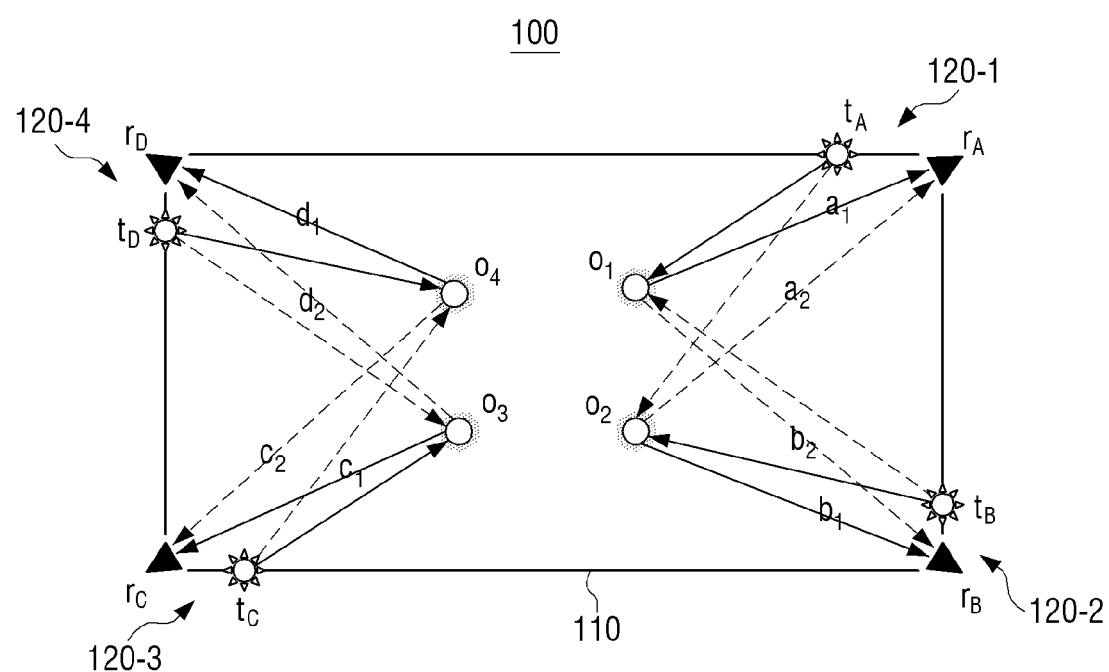
FIG. 5 illustrates a method of determining each touch point if a multi-touch is performed on a plurality of objects, according to an exemplary embodiment.

FIG. 5 illustrates a method of determining each touch point if a multi-touch is performed through a plurality of objects, according to an exemplary embodiment.

For example if a multi-touch is performed through two objects, the processor 130 may calculate a distance $a_1$ from the first ultrasonic sensor 120-1 to a first object $o_1$ by using a ToF that is a time during which an ultrasonic signal is irradiated from the first ultrasonic sensor 120-1, and is reflected and returns from the first object $o_1$. The processor 130 may also calculate a distance $b_2$ from the second ultrasonic sensor 120-2 to the first object $o_1$ by using a ToF that is a time during which an ultrasonic signal is irradiated from the second ultrasonic sensor 120-2, and is reflected and returns from the first object $o_1$. The processor 130 may determine a touch point of the first object $o_1$ on a 2D coordinate of the display 110 by using the calculated distances $a_1$ and $b_2$.

A process of determining a touch point of a second object $o_2$ is the same as the above-described process. The processor 130 may calculate a distance $b_1$ from the second ultrasonic sensor 120-2 to the second object $o_2$ by using a ToF that is a time during which an ultrasonic signal is irradiated from the second ultrasonic sensor 120-2, and is reflected and returns from the second object $o_2$. The processor 130 may also calculate a distance $a_2$ from the first ultrasonic sensor 120-1 to the second object $o_2$ by using a ToF that is a time during which an ultrasonic signal is irradiated from the first ultrasonic sensor 120-1, and is reflected and returns from the second object $o_2$. The processor 130 may determine a touch point of the second object $o_2$ on a 2D coordinate of the display 110 by using the calculated distances $b_1$ and $a_2$.

Figure 6A:
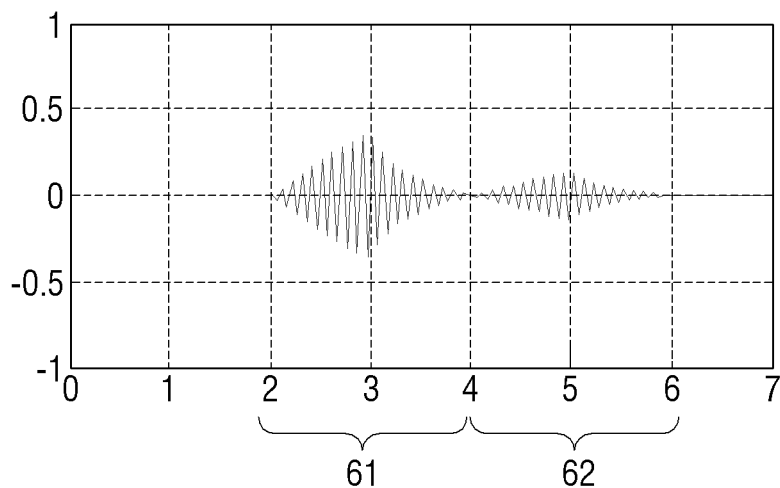
FIGS. 6A and 6B are graphs illustrating waveforms of an ultrasonic signal received by an ultrasonic sensor in a multi-touch, according to an exemplary embodiment.
Figure 6B:
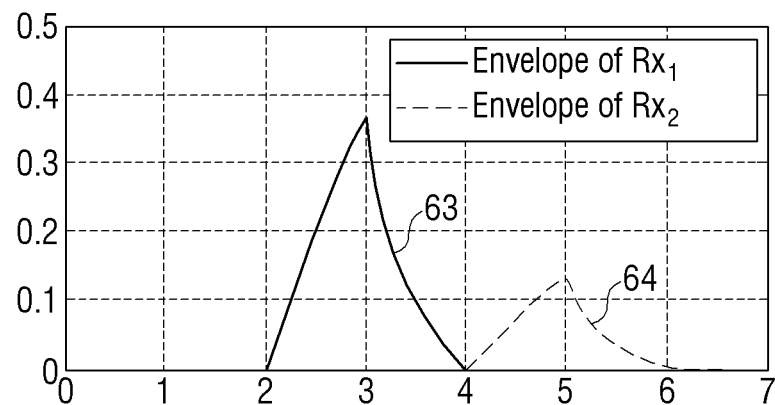

FIGS. 6A and 6B are graphs illustrating a waveform of an ultrasonic signal that is received by an ultrasonic sensor in a multi-touch according to an exemplary embodiment.

A waveform of a signal illustrated in FIG. 6A may be assumed as a reflected signal received by the first ultrasonic sensor 120-1. As shown in FIG. 6A, the waveform of the reflected signal may include a waveform 61 of a signal that is irradiated from the first ultrasonic sensor 120-1, and is reflected and returns from the first object $o_1$ and a waveform 62 of a signal that is irradiated from the first ultrasonic sensor 120-1, and is reflected and returns from the second object $o_2$ farther away from the first ultrasonic sensor 120-1 than the first object $o_1$. Here, the waveforms 61 and 62 of the two signals do not overlap each other.

Here, the processor 130 may detect times when two signals are respectively received by the first ultrasonic sensor 120-1, from the waveforms 61 and 62 of the reflected signals of FIG. 6A. Referring to FIG. 6A, a time when a signal reflected from the first object $o_1$ is received is a time corresponding to 2 on a horizontal axis, and a time when a signal reflected from the second object $o_2$ is received is a time corresponding to 4 on the horizontal axis. By using this information, the processor 130 may detect ToFs and distances of ultrasonic signals reflected from the first object $o_1$ and the second object $o_2$ by using information about a time when the first ultrasonic sensor 120-1 irradiates an ultrasonic signal and a time when each reflected signal is detected.

According to another exemplary embodiment, the touch screen apparatus 100 of the present invention may include a storage (not shown) that stores a reflected waveform of an ultrasonic signal depending on a distance. Here, the processor 130 may compare the waveforms 61 and 62 of the detected reflected signals with a stored reflected waveform to determine distances from the first ultrasonic sensor 120 to the first object $o_1$ and the second object $o_2$.

Figure 7:
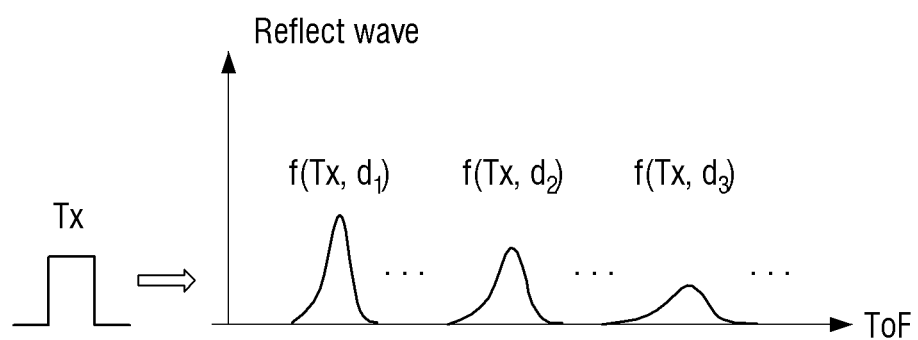
FIG. 7 is a graph illustrating a reflected waveform model of an ultrasonic signal depending on a distance according to an exemplary embodiment.

In detail, as shown in FIG. 6B, the processor 130 may extract an envelope 63 of the waveform 61 of the signal reflected from the first object $o_1$ and an envelope 64 of the waveform 62 of the signal reflected from the second object $o_2$ and compare the extracted envelope 64 with an envelope of a reflected waveform of an ultrasonic signal depending on a distance stored in the storage. As shown in FIG. 7, the storage may store a reflected waveform model of an ultrasonic signal depending on a distance in a multi-touch.

Referring to FIG. 7, the storage may store a look-up table (LUT) on which a distance from an ultrasonic sensor to an object or a ToF is mapped in response to an envelope characteristic of a reflected signal waveform that is reflected and returns from the object in an irradiated ultrasonic signal Tx. Therefore, the processor 130 may search the LUT stored in the storage for a value of a distance or a ToF corresponding to characteristics of slopes and intensities of the envelopes 63 and 64 of extracted reflected signals to determine distances from the first ultrasonic sensor 120-1 to the first object $o_1$ and the second object $o_2$.

However, if touch points detected by two or more objects exist, ultrasonic signals respectively detected from ultrasonic sensors include all of ultrasonic signals respectively reflected from the two or more objects. Therefore, if ToFs respectively detected by the ultrasonic sensors are combined, a coordinate that is not a real touch point, i.e., a ghost touch point, appears. A method of removing a ghost touch will now be described with reference to FIGS. 8A through 8D.

FIGS. 8A through 8D illustrate a method of preventing a ghost touch recognition in a multi-touch according to an exemplary embodiment.

Figure 8A:
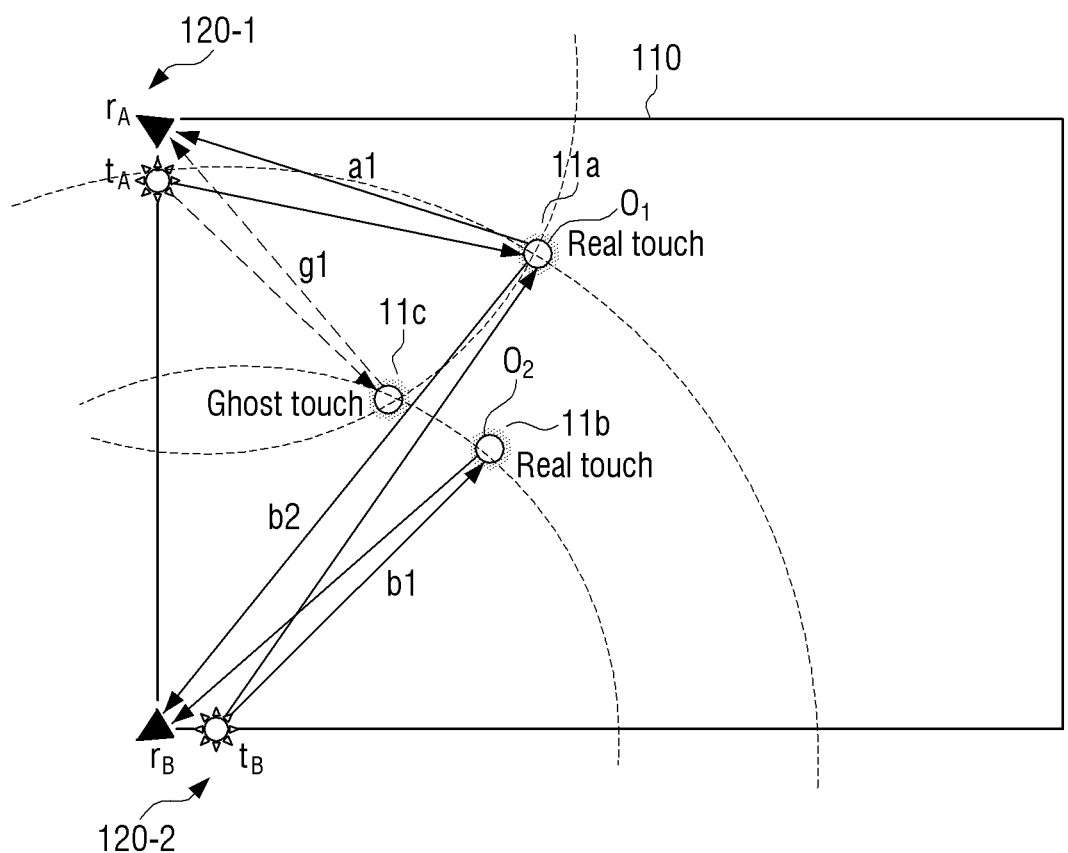
FIGS. 8A through 8D illustrate a method of preventing a ghost touch recognition in a multi-touch according to an exemplary embodiment.
Figure 8B:
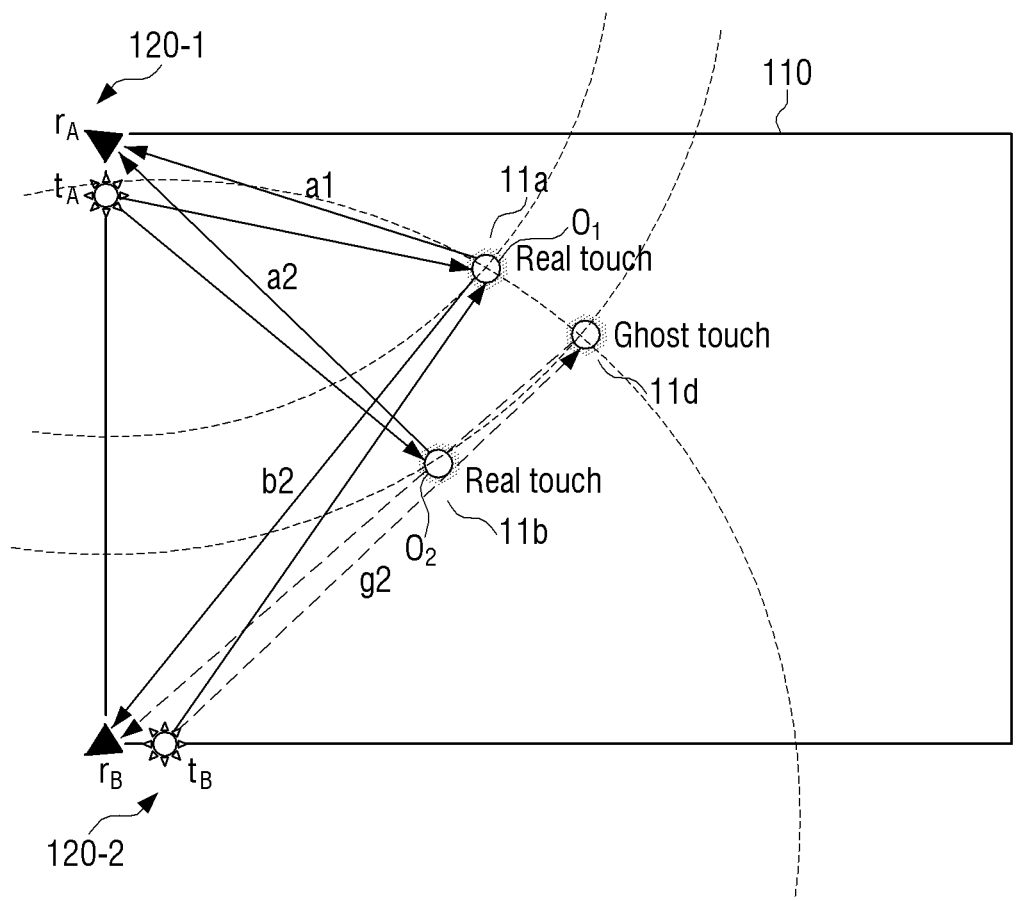
Figure 8C:
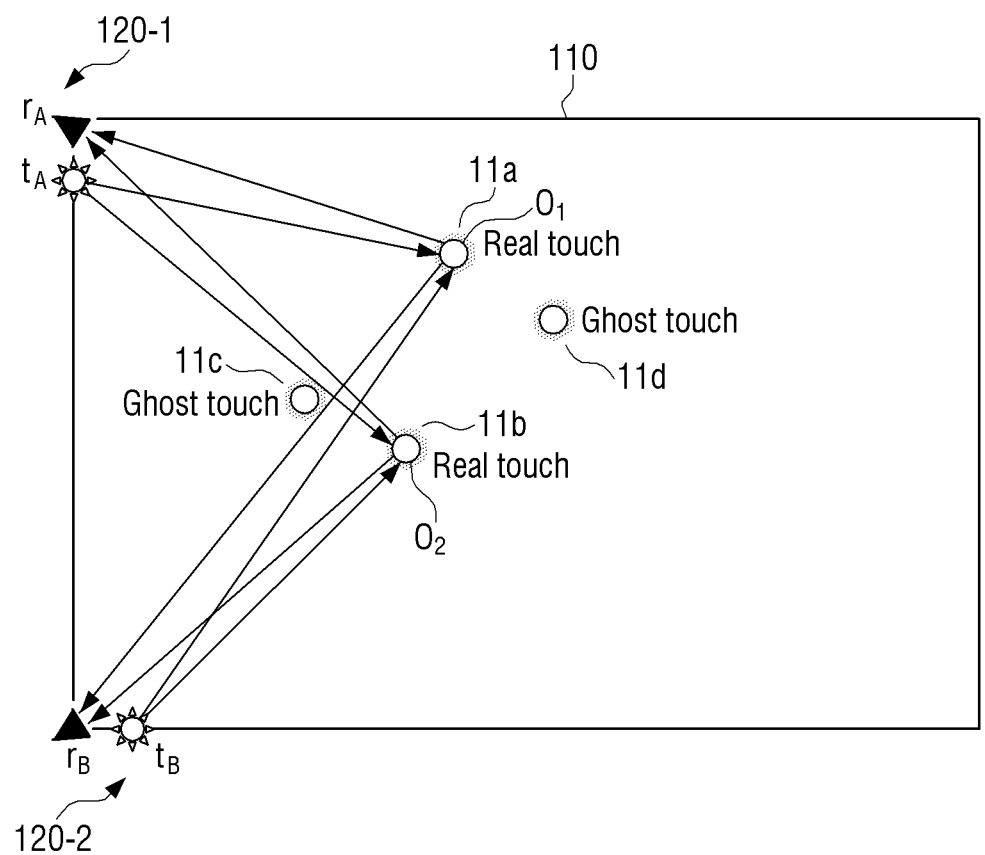

FIGS. 8A and 8C illustrate a process of generating a ghost touch. In detail, referring to FIG. 8A, the processor 130 may detect a ToF of an ultrasonic signal that is irradiated from the first ultrasonic sensor 120-1, and is reflected and returns from a first object $o_1$ to calculate a distance $a_1$ from the first ultrasonic sensor 120-1 to the first object $o_1$. Here, the processor 130 detects a ToF of an ultrasonic signal that is irradiated from the second ultrasonic sensor 120-2, and is reflected and returns from the first object $o_1$ and a ToF of an ultrasonic signal that is irradiated from the second ultrasonic sensor 120-2, and is reflected and returns from a second object $o_2$, and determines distances $b_2$ and $b_1$, respectively. Therefore, a problem of a possibility of a combination of two types occurs. In other words, if the distance $a_1$ from the first ultrasonic sensor 120-1 to the first object $o_1$ and a distance $b_2$ from the second ultrasonic sensor 120-2 to the first object $o_1$ are combined, a real touch point 11a is detected. If the distance $a_1$ from the first ultrasonic sensor 120-1 to the first object $o_1$ and a distance $b_1$ from the second ultrasonic sensor 120-2 to the second object $o_2$ are combined, a ghost touch point 11c is detected.

Similar to the situation shown in FIG. 8A, FIG. 8B illustrates a phenomenon where if a ToF of an ultrasonic signal that is irradiated from the first ultrasonic sensor 120-1, and is reflected and returns from the second object $o_2$ and a ToF of an ultrasonic signal that is irradiated from the second ultrasonic sensor 120-2, and is reflected and returns from the first object $o_1$ are combined, a ghost touch point 11d is generated.

Therefore, as shown in FIG. 8C, besides the real touch points 11a and 11b, the ghost touch points 11c and 11d are additionally generated through a combination of distances respectively detected by ultrasonic sensors. Therefore, a touch recognition error occurs.

In order to prevent a recognition of a ghost touch, if an ultrasonic signal is irradiated from the first ultrasonic sensor 120-1, refracted from the first object $o_1$, and received by the second ultrasonic sensor 120-2, the processor 130 may remove a ghost touch point of the first object $o_1$ by additionally using a ToF of the refracted and received ultrasonic signal to determine a touch point of the first object $o_1$.

In detail, the processor 130 may separate an ultrasonic signal, which is reflected from another object except a first object, from an ultrasonic signal received by the first ultrasonic sensor 120-1 to extract an ultrasonic signal reflected from the first object $o_1$. The processor 130 may extract an ultrasonic signal, which is reflected from the second object $o_2$, from an ultrasonic signal received by the second ultrasonic sensor 120-2 by using a ToF of the ultrasonic signal refracted and received from the first object $o_1$. Therefore, the processor 130 may determine a touch point of the first object $o_1$ based on the extracted ultrasonic signals. Here, the first object $o_1$ may be an object that is touched at a point relatively closer to the first ultrasonic sensor 120-1 than another object, i.e., may an ultrasonic signal that is reflected from the first object $o_1$ and then first received by the first ultrasonic sensor 120-1.

Figure 8D:
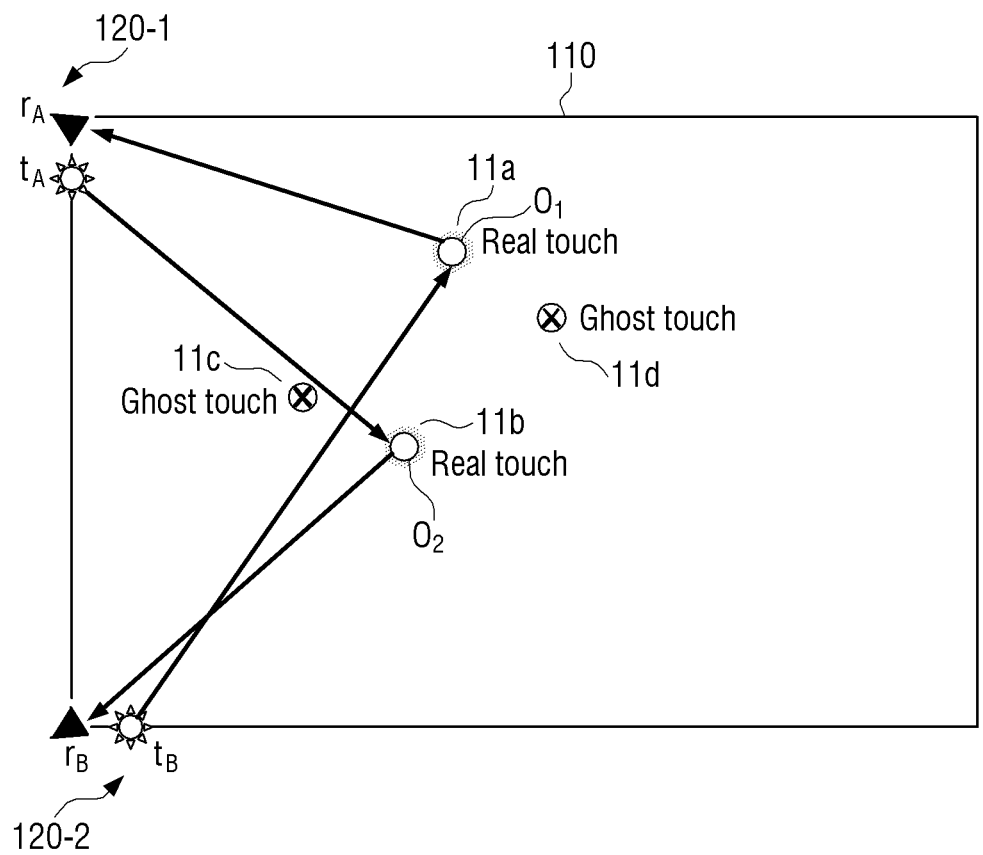

For example, referring to FIG. 8D, there may exist an ultrasonic signal that is refracted from the first object $o_1$ and received by the second ultrasonic sensor 120-2 among ultrasonic signals that are irradiated from the first ultrasonic sensor 120-1. The processor 130 may detect a ToF of a refracted signal as described above and determine a point satisfying the ToF of the detected refracted signal as the real touch point 11a among the real touch point 11a and the ghost touch point 11c. Here, the processor 130 may calculate a ToF of a virtual refracted signal that is irradiated from the first ultrasonic sensor 120-1, refracted from the real touch point 11a, and received by the second ultrasonic sensor 120-2 and a ToF of a virtual refracted signal that is refracted from the ghost touch point 11c and received by the second ultrasonic sensor 120-2, and perform a process of comparing the calculated ToFs with a ToF of a really detected refracted signal.

For this, the first ultrasonic sensor 120-1 and the second ultrasonic sensor 120-2 may synchronize with each other. The first ultrasonic sensor 120-1 and the second ultrasonic sensor 120-2 that synchronize with each other may share ultrasonic signals respectively irradiated from the first ultrasonic sensor 120-1 and the second ultrasonic sensor 120-1 and time information of received ultrasonic signals. Therefore, a ToF of a refracted signal may be detected in the above-described exemplary embodiment.

Figure 9:
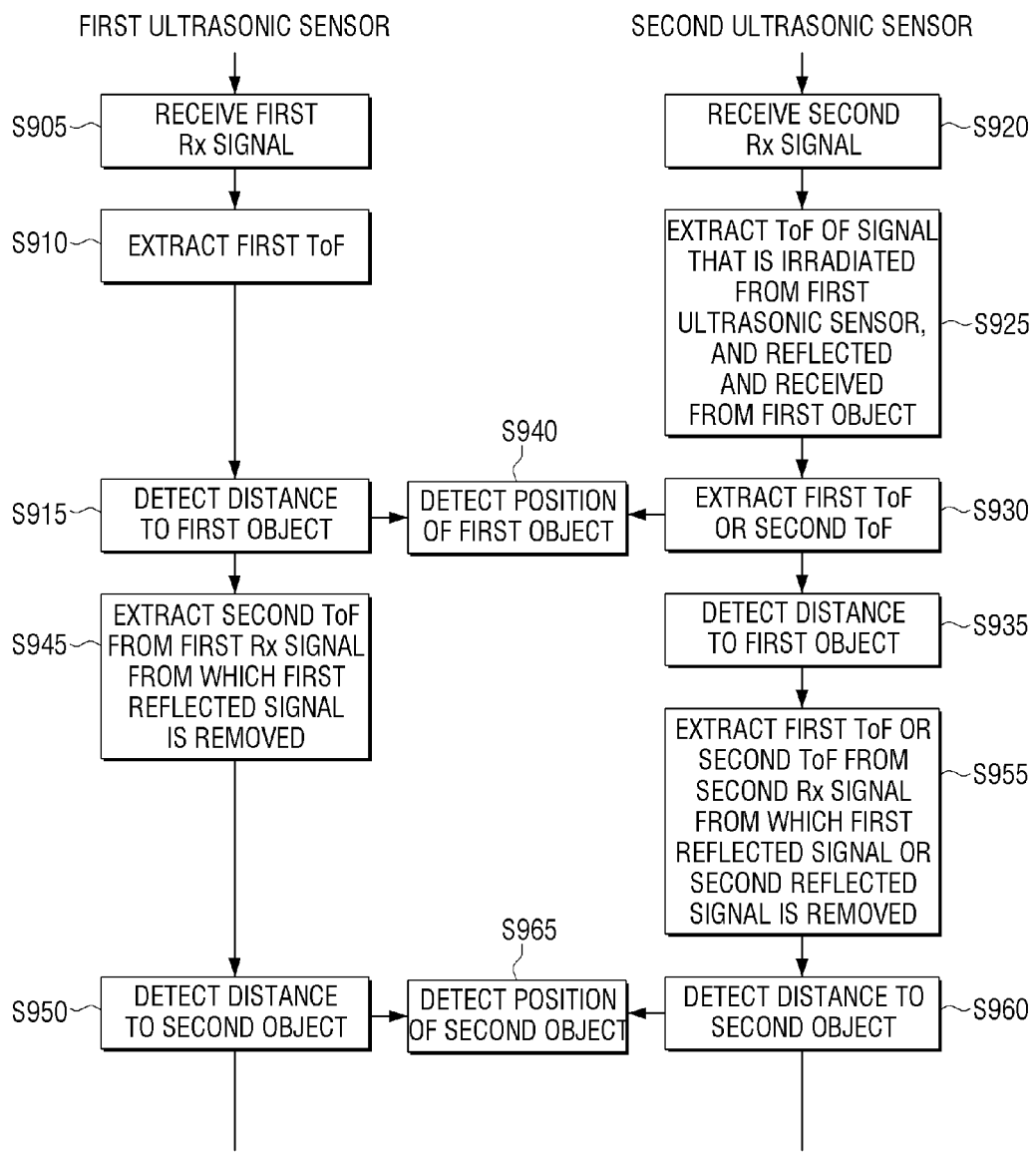
FIG. 9 is a flowchart of a process of determining each touch point in a multi-touch according to an exemplary embodiment.

FIG. 9 is a flowchart of a process of determining each touch point in a multi-touch according to an exemplary embodiment.

In operation S905, the first ultrasonic sensor 120-1 receives a reflected signal (a first Rx signal). In operation S910, the first ultrasonic sensor 120-1 extracts a ToF (a first ToF) of a signal reflected from an object $o_1$ that is touched at a point closest to the first ultrasonic sensor 120-1. Here, the object $o_1$ that is touched at the point closest to the first ultrasonic sensor 120-1 is defined as a first object, and an object $o_2$ that is touched at another point is defined as a second object.

In operation S915, the first ultrasonic sensor 120-1 detects a distance from the first ultrasonic sensor 120-1 to the first object $o_1$ based on the extracted ToF.

In operation S920, the second ultrasonic sensor 120-2 receives a reflected signal (a second Rx signal). In operation S925, the second ultrasonic sensor 120-2 extracts a ToF of an ultrasonic signal, which is refracted from the first object $o_1$ and received by the second ultrasonic sensor 120-2, from the first ultrasonic sensor 120-1. The second ultrasonic sensor 120-2 determines an ultrasonic signal, which is reflected and received from the first object $o_1$, from the second Rx signal received from the second ultrasonic sensor 120-2 based on the extracted ToF. In operation S930, the second ultrasonic sensor 120-2 extracts a ToF (a first ToF) of a fastest signal of signals constituting the second Rx signal or a ToF (a second ToF) of a next signal.

In operation S940, a position of the first object $o_1$ is detected by trigonometry that uses the distance from the first ultrasonic sensor 120-1 to the first object $o_1$ in operation S915 and the distance from the second ultrasonic sensor 120-2 to the first object $o_1$ in operation S930.

In operation S945, the first ultrasonic sensor 120-1 removes an ultrasonic signal (a first reflected signal) reflected from the first object $o_1$ to extract a ToF (a second ToF) of an ultrasonic signal (a second reflected signal) reflected from the second object $o_2$. In operation S950, the first ultrasonic sensor 120-1 detects a distance from the first ultrasonic sensor 120-1 to the second object $o_2$.

In operation S955, the second ultrasonic sensor 120-2 extracts the first ToF or the second ToF from the second Rx signal from which the first reflected signal or the second reflected signal corresponding to the ultrasonic signal reflected from the first object $o_1$ is removed. In operation S960, the second ultrasonic sensor 120-2 detects a distance from the second ultrasonic sensor 120-2 to the second object $o_2$.

In operation S965, a position of the second object $o_2$ is detected by trigonometry that uses the distance from the first ultrasonic sensor 120-1 to the second object $o_2$ in operation S950 and the distance from the second ultrasonic sensor 120-2 to the second object $o_2$ in operation s960.

Figure 10A:
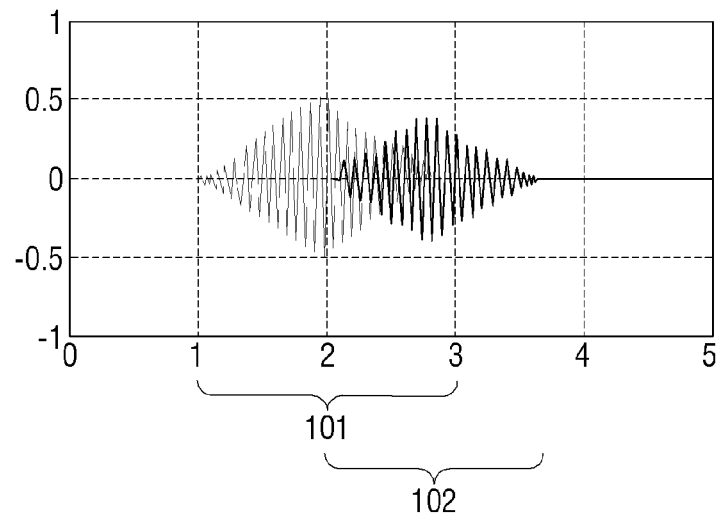
FIGS. 10A through 10C illustrate a waveform of an ultrasonic signal received by an ultrasonic sensor in a multi-touch according to another exemplary embodiment.
Figure 10B:
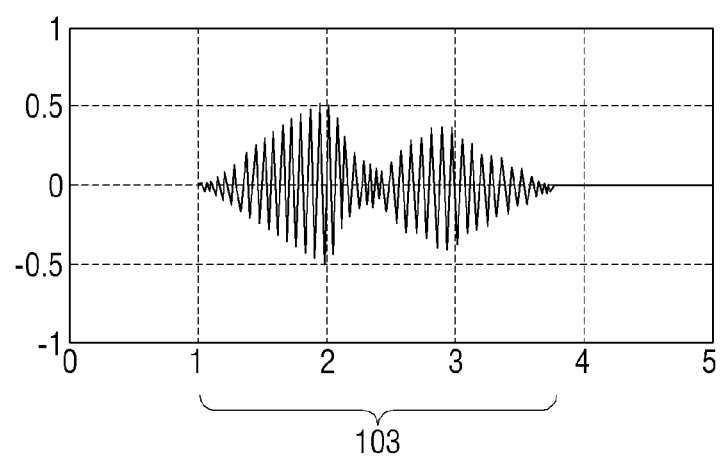
Figure 10C:
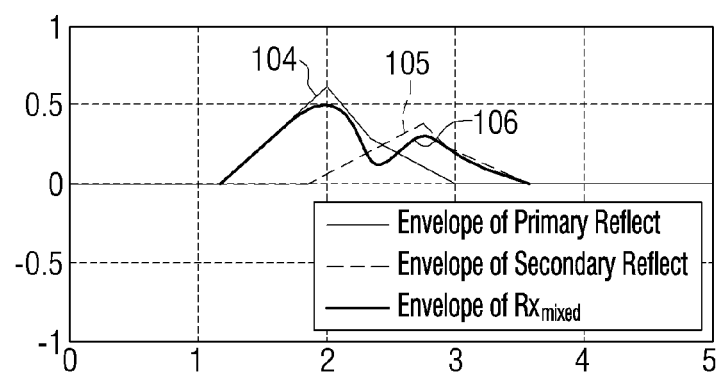

FIGS. 10A through 10C are graphs illustrating a waveform of an ultrasonic signal that is received by an ultrasonic sensor in a multi-touch according to another exemplary embodiment.

Referring to FIGS. 10A and 10B, a waveform 101 of a reflected signal received by an ultrasonic sensor may be a form where partial areas of waveforms 102 and 103 of two ultrasonic signals, which are reflected respectively from the first object $o_1$, and the second object $o_2$ of a point relatively farther away from the ultrasonic sensor than the first object $o_1$, overlap each other. Here, the ultrasonic sensor will be described as the first ultrasonic sensor 120-1. A degree of overlap between two ultrasonic signals may be large when there is a small difference between a distance $a_1$ from the first ultrasonic sensor 120-1 to the first object $o_1$ and a distance $a_2$ from the first ultrasonic sensor 120-1 to the second object $o_2$.

The storage may store a reflected waveform model depending on a size of an overlap area of a reflected signal where ultrasonic signals respectively reflected from the first object $o_1$ and the second object $o_2$ overlap each other.

Here, the processor 130 may extract an envelope 106 of the waveform 101 of the reflected signal received by the first ultrasonic sensor 120-1 and compare the extracted envelope 106 with an envelope of a stored reflected waveform model to respectively detect independent envelop models 104 and 105 of the waveforms 102 and 103 of the two ultrasonic signals, respectively. A detailed detection process will be described later with reference to FIG. 12.

Figure 11A:
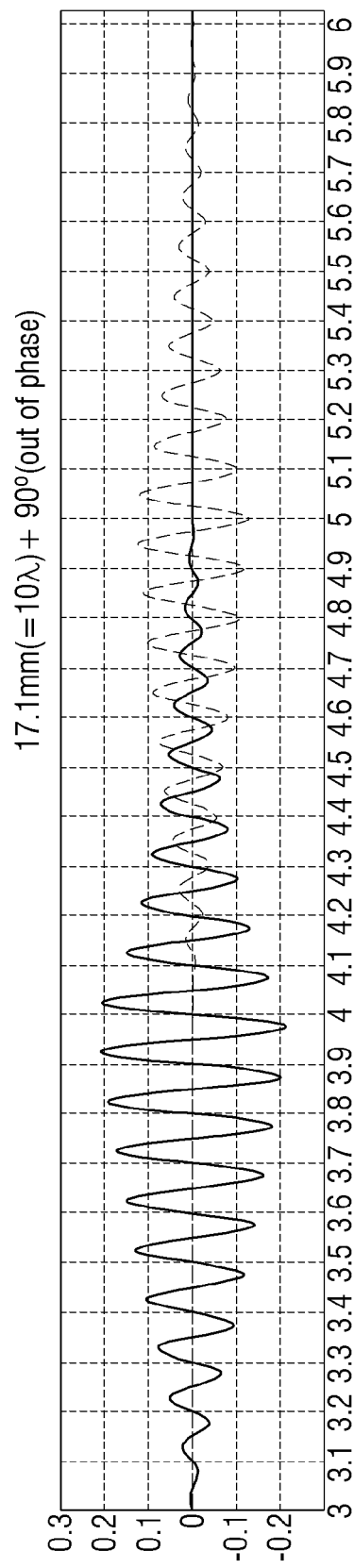
FIGS. 11A and 11B illustrate a method of detecting a phase difference between a first reflected signal and a second reflected signal in a multi-touch according to an exemplary embodiment.
Figure 11B:
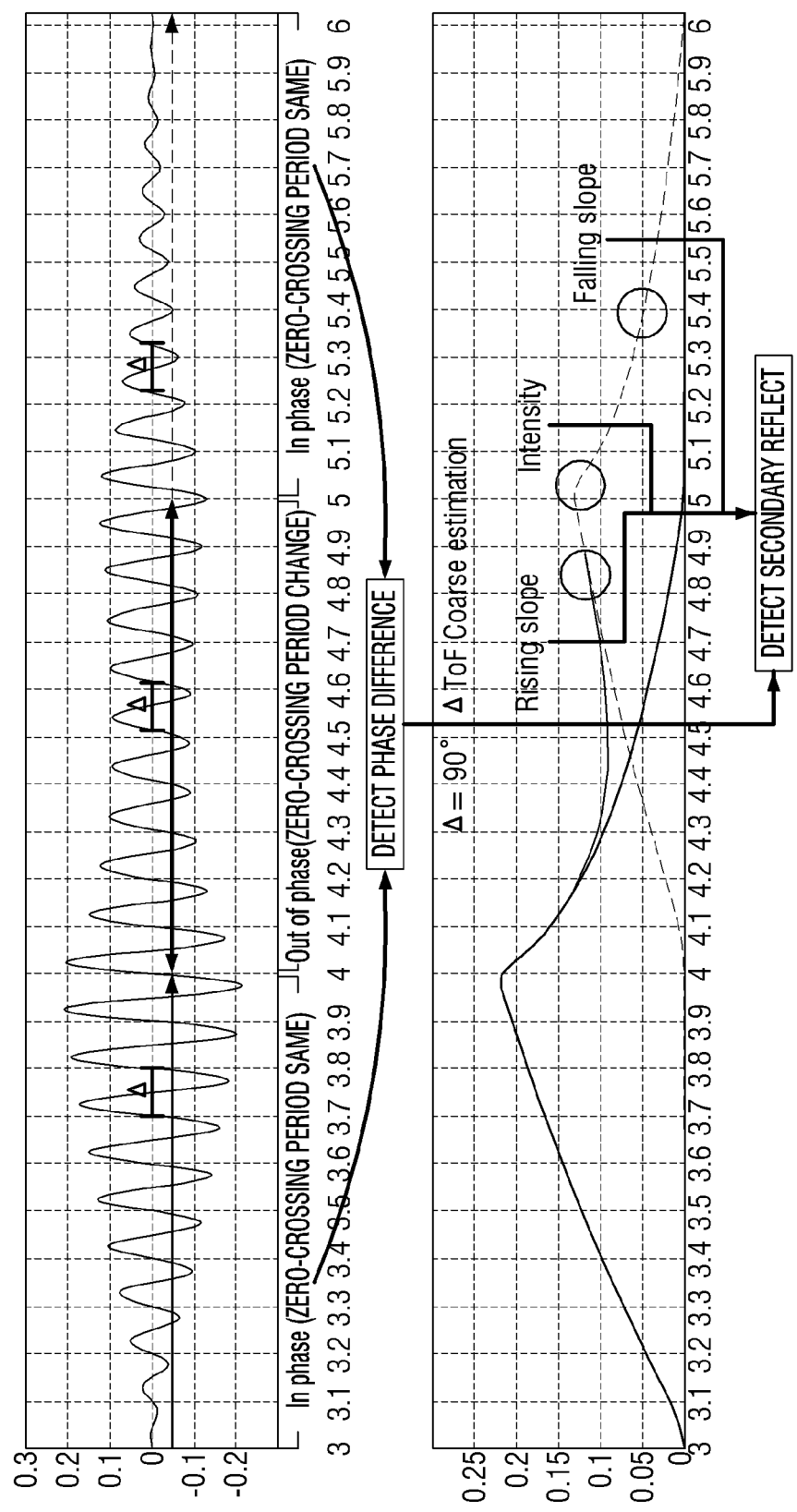

FIGS. 11A and 11B illustrate a method of detecting a phase difference between a first reflected signal and a second reflected signal in a multi-touch according to an exemplary embodiment.

As shown in FIG. 11A, a reflected signal received by the first ultrasonic sensor 120-1 may have a form where an ultrasonic signal (a solid line) reflected from a first object $o_1$ and an ultrasonic signal (a dotted line) reflected from a second object $o_2$ overlap each other. For convenience of description, the ultrasonic signal reflected from the first object $o_1$ will be referred to as a first reflected signal, and the ultrasonic signal reflected from the second object $o_2$ will be referred to as a second reflected signal. Also, an area where only the first reflected signal is received will be referred to as a first area, an area where the first and second reflected signals overlap each other and then are received will be referred to as a second area, and an area where only the second reflected signal is received will be referred to as a third area. An interval (a length of the second area) at which the first and second reflected signals are received corresponds to 10.25λ, and the first and second reflected signals have a phase difference of 90°.

The reflected signal received by the first ultrasonic sensor 120-1 is as shown in FIG. 11B. Referring to FIG. 11B, a period is kept constant in the first area where only the first reflected signal is received (in phase) and then changes in the second area where the first and second reflected signals overlap each other, due to a phase difference (out of phase). Thereafter, the period is kept constant in the third area where only the second reflected signal is received (in phase). However, signals received in the first and third areas have a phase difference of 90°.

Therefore, the processor 130 may compare a phase of the first reflected signal in the first area where only the reflected signal is received and a phase of the second reflected signal in the third area where only the second reflected signal is received to detect a phase difference between the first and second reflected signals. The processor 130 may detect a ToF of the second reflected signal by synthetically using distance information of the first area where only the first reflected signal is received, information about the phase difference between the first and second reflected signals, and information about a rising slope, a falling slope, and an intensity of the second reflected signal. A detailed explanation of this detection method will now be described with reference to FIG. 12.

Figure 12:
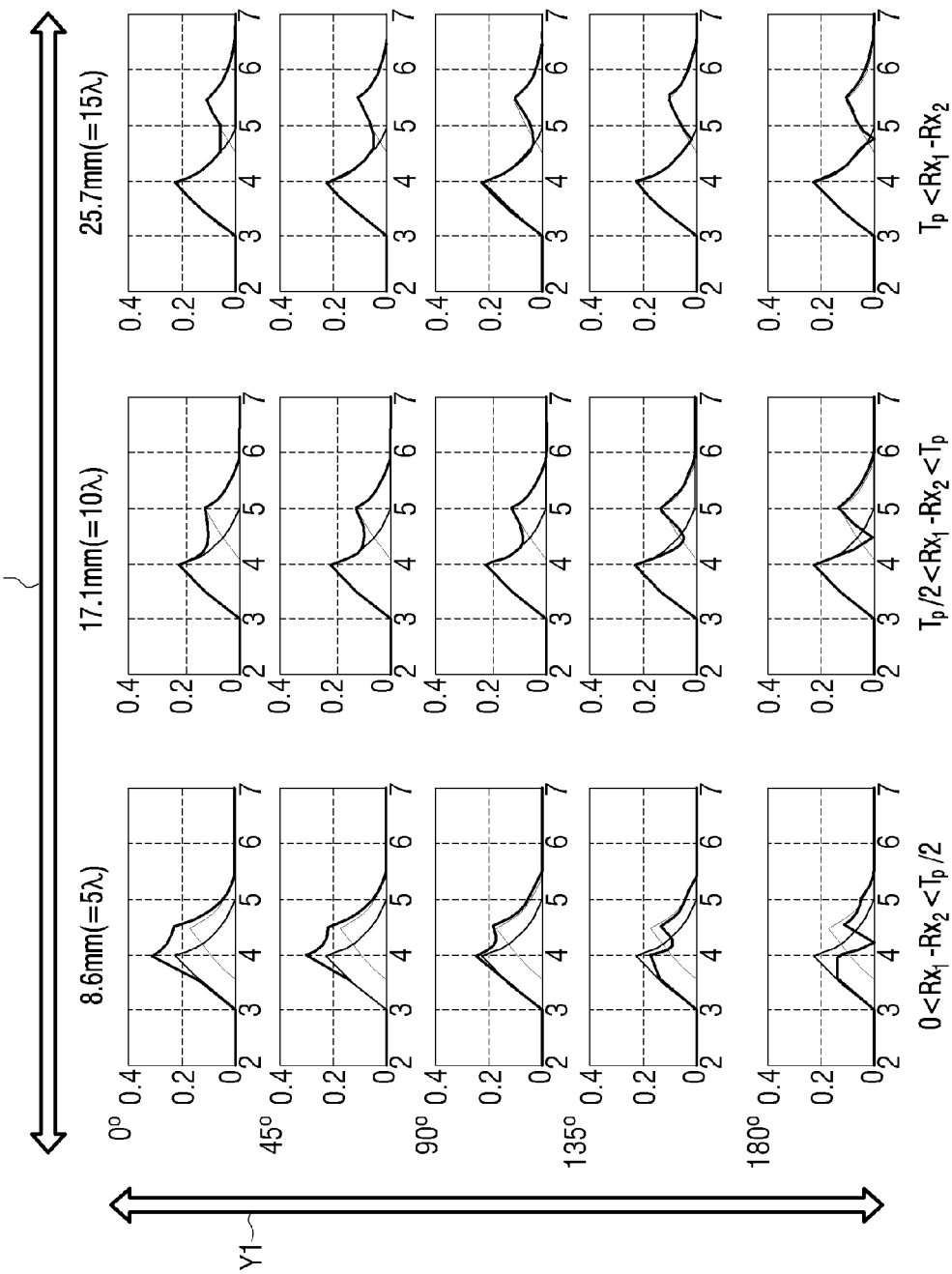
FIG. 12 illustrates a reflected waveform model depending on a size of an overlapping area between a first reflected signal and a second reflected signal and a phase difference between the first reflected signal and the second reflected signal in a multi-touch according to an exemplary embodiment.

FIG. 12 illustrates a reflected waveform model depending on a size of an overlap area between first and second reflected signals and a phase difference between the first and second reflected signals in a multi-touch according to an exemplary embodiment.

The storage may store a reflected waveform depending on at least one of a size of an overlap area of an overlapping ultrasonic signal between ultrasonic signals respectively reflected from first and second objects, and a phase difference of the ultrasonic signals.

Here, the processor 130 may extract a reflected waveform corresponding to at least one of an intensity value and a slope value of the overlapping ultrasonic signal, from a candidate group of reflected waveforms corresponding to at least one of the size of the overlap area where the ultrasonic signals respectively reflected from the first and second objects overlap each other, and the phase difference between the ultrasonic signals. The processor 130 may then determine at least one of the overlap area where the ultrasonic signals respectively reflected from the first and second objects overlap each other, and the phase difference between the ultrasonic signals.

Referring to FIG. 12, the storage may store independent reflected waveform models of first and second reflected signals corresponding to a characteristic of a reflected signal waveform depending on a size of an overlap area where the first and second reflected signals overlap each other and a phase difference between the first and second reflected signals, in a reflected signal waveform received by an ultrasonic sensor. FIG. 12 illustrates envelope models of independent reflected waveforms of first and second reflected signals that are stored in a LUT form in the storage.

In detail, the envelope models stored in the storage may be classified according to a size of a first area. For example, the size of the first area may be defined as $Rx_1$-$Rx_2$, and a distance from a point at which receiving of the first reflected signal starts to a point at which the receiving of the first reflected signal ends, or a distance from a point at which receiving of the second reflected signal starts to a point at which the receiving of the second reflected signal ends may be defined as $T_p$. Here, the envelope models stored in the storage may be classified into a first envelope model group satisfying an expression of $0 < Rx_1$-$Rx_2 < T_p/2$ (leftmost column in FIG. 12), a second envelope model group satisfying an expression of $T_p/2 < Rx_1$-$Rx_2 < T_p$ (middle column in FIG. 12), and a third envelope model group satisfying an expression of $T_p < Rx_1$-$Rx_2$ (rightmost column in FIG. 12). In other words, the first envelope model group is a group where more than half of the first reflected signal and more than half of the second reflected signal overlap each other and includes an overlap area having a largest size. The third envelope model group includes an overlap area between the first and second reflected signals, wherein the overlap area has a smallest size. For example, a size of a first area of the first envelope model group corresponds to about 5λ, a size of a first area of the second envelope model group corresponds to about 10λ, and a size of a first area of the third envelope model group corresponds to about 15λ.

As shown in FIG. 12, a horizontal axis X1 classifies a reception interval $Rx_1$-$Rx_2$ between first and second reflected signals according to a size of a real number value except a value of a decimal point unit. A vertical axis Y1 classifies the reception interval between the first and second reflected signals in consideration of a size of a decimal value of a decimal point unit, i.e., only a phase difference.

From the LUT, the processor 130 may detect an envelope model group corresponding to a phase difference between reflected signals received by the first ultrasonic sensor 120-1 and a size of a first area from the horizontal axis X1 and the vertical axis Y1 to narrow candidate model groups. Also, the processor 130 may compare a slope and an intensity of a received reflected signal with a candidate model group to finally determine a corresponding envelope model.

Figure 13:
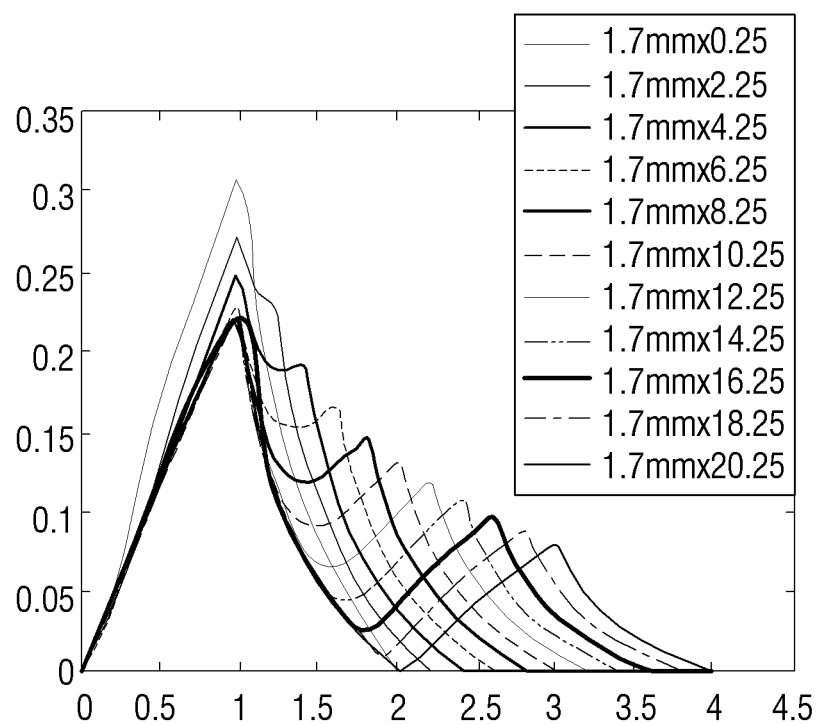
FIG. 13 is a graph illustrating a model depending on a size of an overlapping area between a first reflected signal and a second reflected signal if the first reflected signal and the second reflected signal have a particular phase difference, in a multi-touch according to an exemplary embodiment.

For example, as shown in FIG. 13, if a phase difference is determined, a candidate model group including a plurality of envelope models having corresponding phase differences and different real number values may be a model group that is to be searched for.

An interval difference between the first and second reflected signals according to a classification depending on a phase difference on the vertical axis Y1 is relatively smaller than on the horizontal axis X1. As a size of an overlap area between the first and second reflected signals becomes larger, a waveform of a reflected signal received by the first ultrasonic sensor 120-1 sensitively changes according to a phase difference. In particular, the determination of the phase difference may be performed with respect to the first envelope model group as shown in FIG. 11.

If a final envelope model is determined according to the above-described process, the processor 130 may estimate a time when receiving of a second reflected signal starts, from an independent envelope model of the second reflected signal and detect a ToF of an ultrasonic signal that is irradiated from the first ultrasonic sensor 120-1, and is reflected and returns from a second object.

Figure 14A:
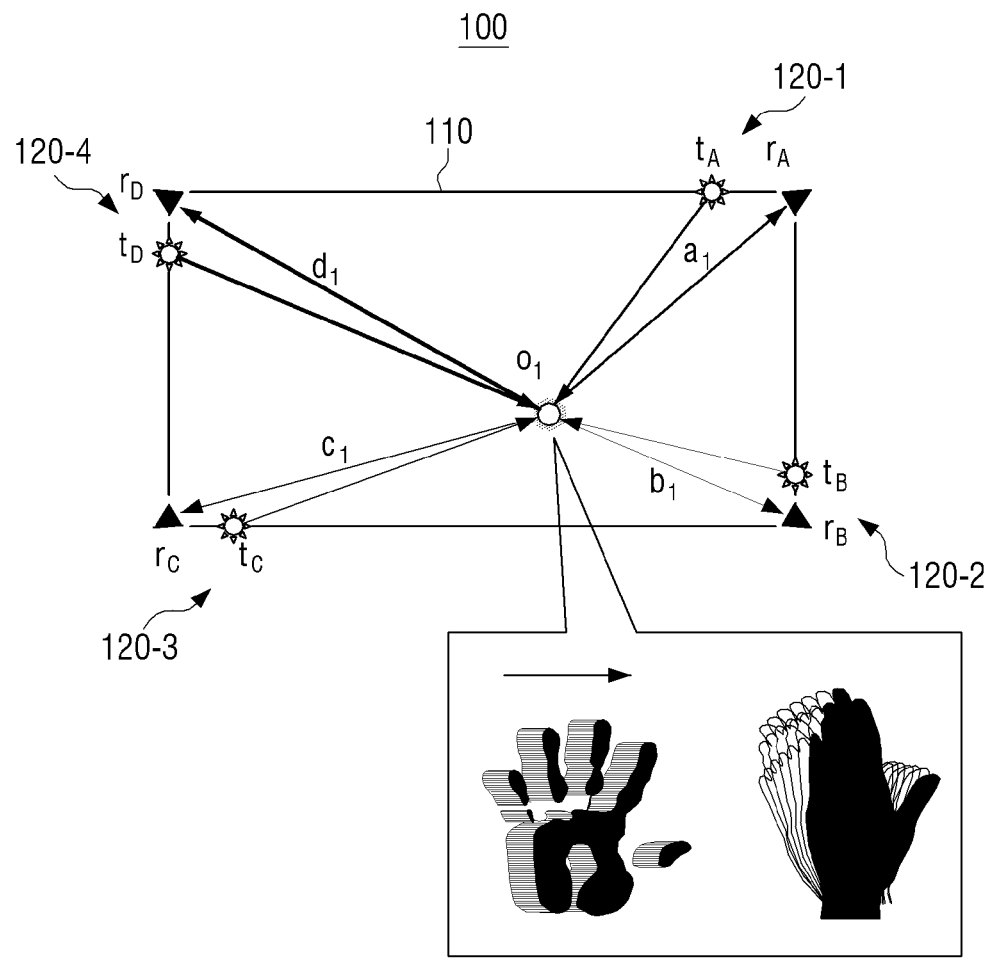
FIGS. 14A and 14B illustrate a method of detecting outer dots of an object to estimate a size and a shape of the object according to an exemplary embodiment.
Figure 14B:
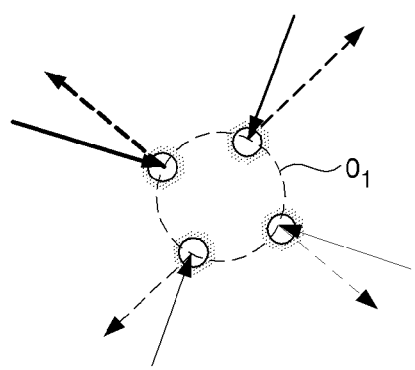

FIGS. 14A and 14B illustrate a method of detecting outer dots of an object to estimate a size and a shape of the object according to an exemplary embodiment.

As shown in FIG. 14A, if a surface touch is performed on the display 110 through an object $o_1$, a technical spirit of the present inventive concept may be applied to a technical field that detects a shape of the touched surface of the object $o_1$. In detail, as shown in FIG. 14B, the processor 130 may calculate ToFs of ultrasonic signals that are irradiated from ultrasonic sensors respectively provided at corners of the display 110, reflected from an object, and respectively return to the ultrasonic sensors, to detect outer dots of the object $o_1$. Here, the processor 130 may connect the outer dots of the object $o_1$ to estimate a size and a shape of the object $o_1$.

Figure 15A:
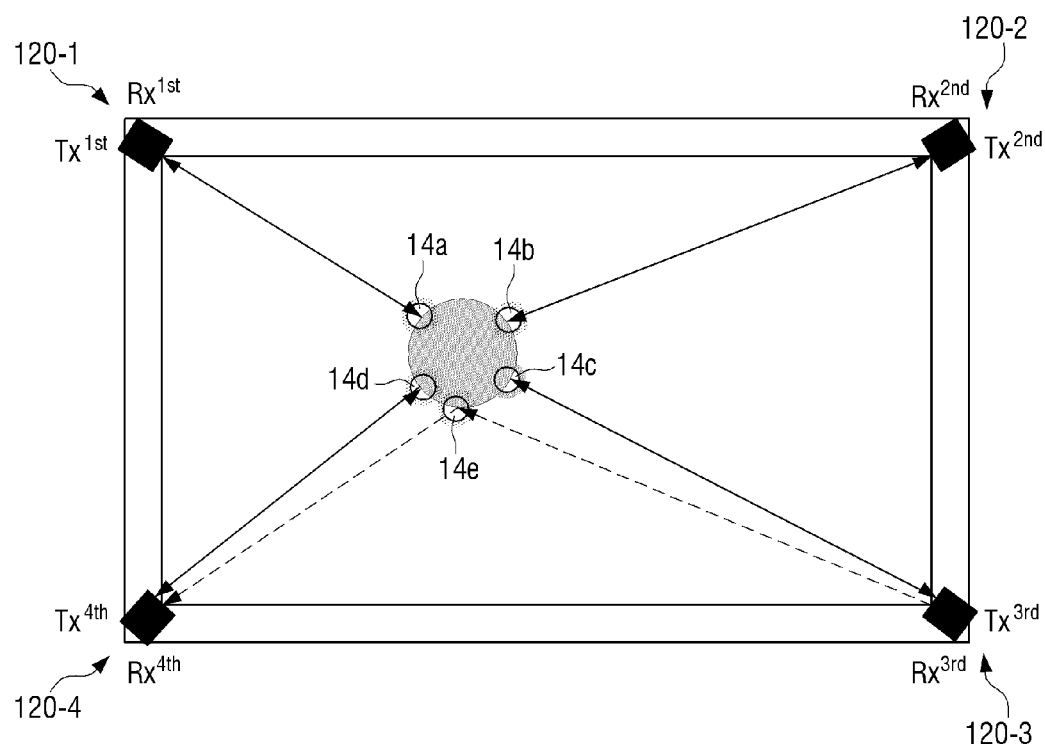
FIGS. 15A and 15B illustrate a method of estimating a size and a shape of an object according to an exemplary embodiment.
Figure 15B:
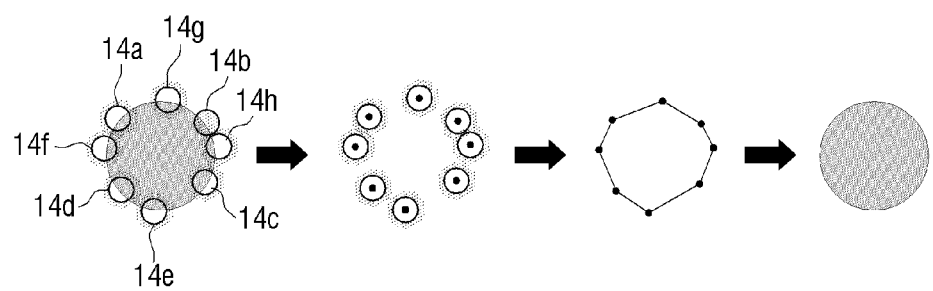

FIGS. 15A and 15B illustrate a method of estimating a size and a shape of an object according to an exemplary embodiment.

The processor 130 may calculate a time that is a time during which an ultrasonic signal is irradiated from one ultrasonic sensor, refracted from an object, and received by another ultrasonic sensor, to detect an additional outer dot of the object. As shown in FIGS. 15A and 15B, a portion of an ultrasonic signal irradiated from the third ultrasonic sensor 120-3 may be refracted from an object and then received by the fourth ultrasonic sensor 120-4. Here, the processor 130 may calculate a ToF of the ultrasonic signal refracted from the object to detect an outer dot 14$e$ at which a refraction is performed.

To calculate the ToF of the ultrasonic signal refracted from the object to detect the outer dot 14$e$, the third and fourth ultrasonic sensors 120-3 and 120-4 may synchronize with each other, and ultrasonic signals respectively irradiated from the third and fourth ultrasonic sensors 120-3 and 120-4 may be different signals. For example, the ultrasonic signals respectively irradiated from the third and fourth ultrasonic sensors 120-3 and 120-4 may have distinguished signals having different frequencies. Alternatively, the ultrasonic signals irradiated from the third and fourth ultrasonic sensors 120-3 and 120-4 may be time-divided by the processor 130.

According to the above-described exemplary embodiment, an outer dot of an object may be additionally extracted without increasing the number of ultrasonic sensors. Therefore, a size and a shape of the object may be estimated.

Figure 16:
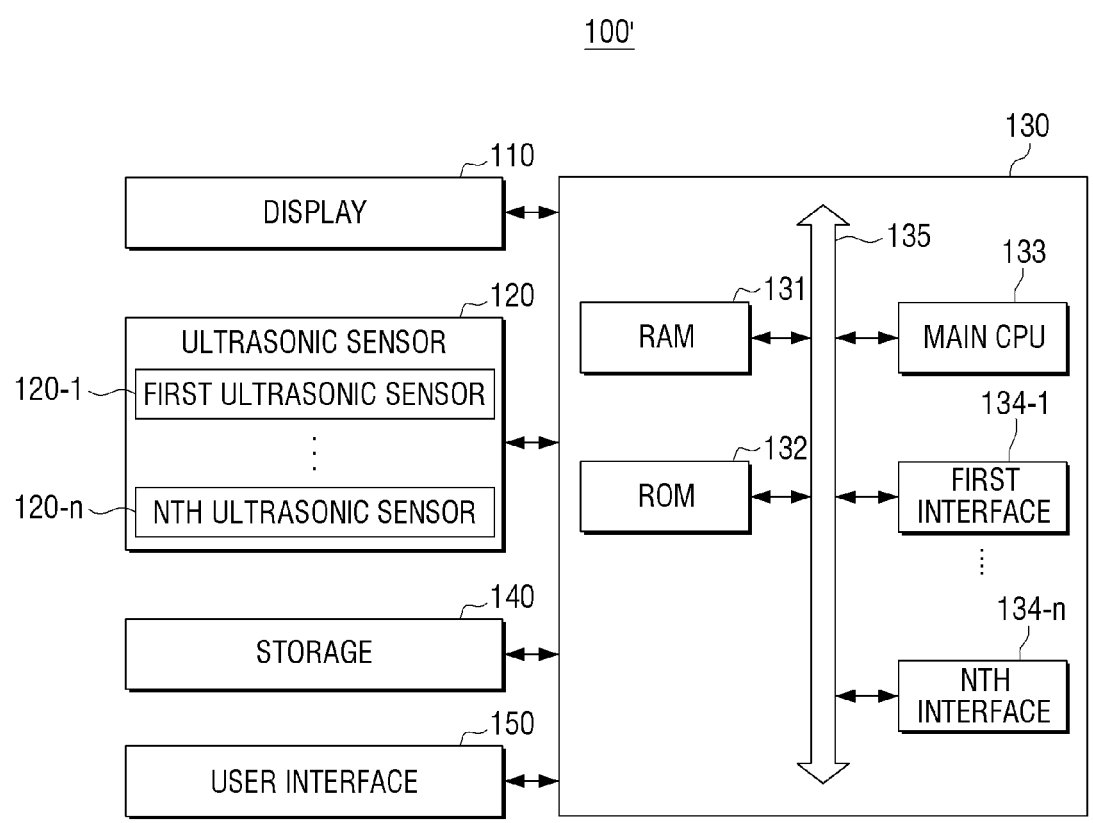
FIG. 16 is a block diagram of a detailed structure of a touch screen apparatus according to another exemplary embodiment.

FIG. 16 is a block diagram of a touch screen apparatus 100' according to another exemplary embodiment. As shown in FIG. 16, the touch screen apparatus 100' according to the present exemplary embodiment includes a display 110, first through $n_{th}$ ultrasonic sensors 120-1 through 120-$n$, a processor 130, a storage 140, and a user interface 150. Hereinafter, descriptions of the same elements of FIG. 16 as those of FIG. 1 are omitted.

The processor 130 is an element that controls an overall operation of the touch screen apparatus 100'. In detail, the processor 130 includes a random access memory (RAM) 131, a read only memory (ROM) 132, a main central processing unit (CPU) 133, first through $n^{th}$ interfaces 134-1 through 134-$n$, and a bus 135. Here, the RAM 131, the ROM 132, the main CPU 133, the first through $n^{th}$ interfaces 134-1 through 134-$n$, etc. may be connected to one another through the bus 135.

The main CPU 133 accesses the storage 140 to perform booting by using a stored operating system (0/S). The main CPU 133 may perform various operations by using various types of programs, contents, and data, etc. stored in the storage 140.

The ROM 132 stores a command set, etc. for booting a system. If a turn-on command is input to supply power, the main CPU 133 copies the 0/S stored in the storage 140 into the RAM 131 and executes the 0/S to boot the system according to a command stored in the ROM 132. If booting is completed, the main CPU 133 copies various types of applications stored in the storage 140 into the RAM 131 and executes the application programs copied into the RAM 131 to perform various types of operations.

The first through $n^{th}$ interfaces 134-1 through 134-$n$ are connected to various types of elements as described above. One of the interfaces may be a network interface that is connected to an external apparatus through a network.

The above-described operation of the processor 130 may be performed by a program stored in the storage 140.

The storage 140 may store an O/S software module for driving the touch screen apparatus 100' and various types of data such as various types of multimedia contents.

In detail, the storage 140 may store a base module that processes a signal transmitted from pieces of hardware included in the touch screen apparatus 100', a storage module that manages a database (DB) or a registry, a graphic processing module that generates a screen of a layout, a security module, etc. In particular, the storage 140 may store programs of a ToF calculator module for detecting a ToF of an ultrasonic signal, a touch coordinate determiner module for detecting a touch point of an object, etc.

As described above, the storage 140 may also store a reflected waveform model of an ultrasonic signal and a reflected waveform model depending on at least one of a size of an overlap area between ultrasonic signals and a phase difference between the ultrasonic signals.

The user interface 150 is an element that senses a user interaction for controlling an overall operation of the touch screen apparatus 100' and may include various types of interaction sensors such as a camera (not shown), a microphone (not shown), etc.

Figure 17:
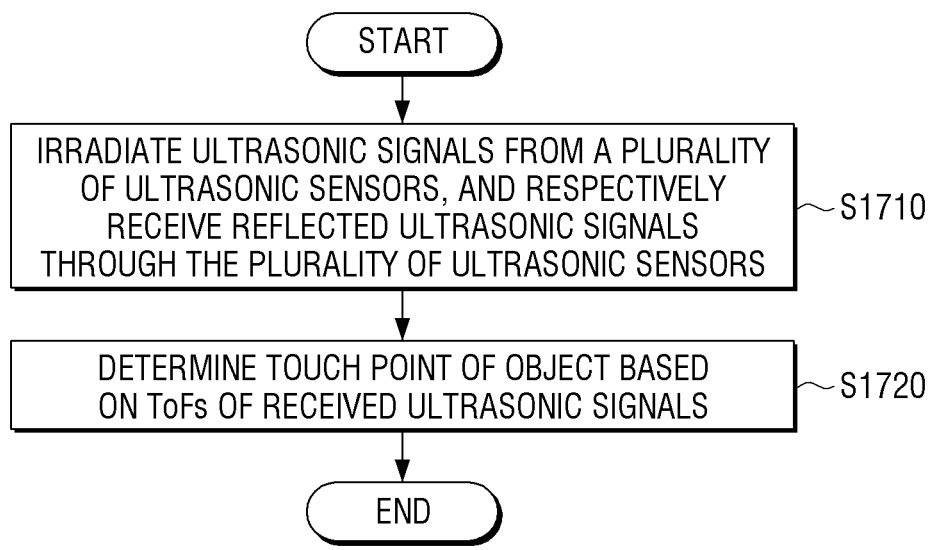
FIG. 17 is a flowchart of a method of controlling a touch screen apparatus according to an exemplary embodiment.

FIG. 17 is a flowchart of a method of controlling a touch screen apparatus according to an exemplary embodiment.

In operation S1710, ultrasonic signals are irradiated from a plurality of ultrasonic sensors, and reflected ultrasonic signals are received by the plurality of ultrasonic sensors. The ultrasonic signals may be reflected from an object that touches a display. Here, ultrasonic signals respectively irradiated from first and second ultrasonic sensors may be reflected from an object and respectively received by the first and second ultrasonic sensors.

In operation S1720, ToFs of the received ultrasonic signals are detected, and a point of the object that is touched is determined based on the detected ToFs. Here, distances from the first and second ultrasonic sensors to a touch point of the object may be calculated based on the ToFs of the received ultrasonic signals. Also, the touch point of the object may be determined based on the calculated distances.

Also, if a plurality of objects are touched on the display, and an ultrasonic signal is irradiated from the first ultrasonic sensor, refracted from a first object, and received by the second ultrasonic sensor, a ghost point of the first object may be removed by additionally using a ToF of the refracted and received ultrasonic signal to determine a touch point of the first object.

In more detail, if a point of the first object relatively closer to the first ultrasonic sensor than another object is touched, an ultrasonic signal reflected from the another object may be separated from an ultrasonic signal received by the first ultrasonic sensor to extract the ultrasonic signal reflected from the first object, and the ultrasonic signal reflected from the first object may be extracted from an ultrasonic signal received by the second ultrasonic sensor by using the ToF of the refracted and received ultrasonic signal. Here, the touch point of the first object may be determined based on the extracted ultrasonic signals.

Also, a reflected waveform of an ultrasonic signal depending on a distance may be stored. Here, waveforms of extracted ultrasonic signals may be compared with stored reflected waveforms to extract distances from the first and second ultrasonic sensors to the touch point of the first object and determine the touch point of the first object based on the calculated distances.

If the ultrasonic signal reflected from the first object and the ultrasonic signal reflected from the second object overlap each other and then are received, ToFs of the ultrasonic signals respectively reflected from the first and second objects may be determined by using at least one of a size of an overlap area where the ultrasonic signals respectively reflected from the first and second objects overlap each other, and a phase difference between the ultrasonic signals.

Here, in an ultrasonic signal where the ultrasonic signals respectively reflected from the first and second objects overlap each other, a reflected waveform depending on at least one of the size of the overlap area and the phase difference may be pre-stored. A reflected waveform corresponding to at least one of a peak value and a slope value of an overlapping ultrasonic signal may be extracted from a candidate group of reflected waveforms corresponding to at least one of the size of the overlap area where the ultrasonic signals respectively reflected from the first and second objects overlap each other, and the phase difference. Here, at least one, which is selected from the size of the overlap area where the ultrasonic signals respectively reflected from the first and second objects overlap each other and the phase difference, may be determined to determine ToFs of the ultrasonic signals respectively reflected from the first and second objects.

According to various exemplary embodiments described above, a touch recognition performance of a touch screen may be improved. Also, the touch screen may be easily provided so as to save cost.

A method of controlling a touch screen apparatus according to the above-described various exemplary embodiments may be embodied as a program and then stored on various types of recording media. In other words, a computer program that may be processed by various types of processors to execute the above-described various control methods may be stored and used on a non-transitory computer-readable medium.

The non-transitory computer-readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A touch screen apparatus comprising:
   a display;
   a plurality of ultrasonic sensors configured to transmit ultrasonic signals; and
   a processor configured to, in response to receiving the ultrasonic signals reflected from an object touched on the display by the plurality of ultrasonic sensors, determine a touch point of the object based on Time of Flights (ToFs) of the received ultrasonic signals,
   wherein the plurality of ultrasonic sensors include a first ultrasonic sensor and a second ultrasonic sensor, and
   wherein the processor determines touch points of a plurality of objects touched on the display based on a ToF of a ultrasonic signal which is transmitted from the first ultrasonic sensor, reflected by the plurality of objects and received by the first ultrasonic sensor, a ToF of an ultrasonic signal which is transmitted from the second ultrasonic sensor, reflected by the plurality of objects and received by the second ultrasonic sensor, and a ToF of an ultrasonic signal which is transmitted from the first ultrasonic sensor, refracted by the plurality of objects and received by the second ultrasonic sensor.

2. The touch screen apparatus of claim 1, wherein in response to the ultrasonic signals being respectively transmitted from the first ultrasonic sensor and second ultrasonic sensor, reflected from the object, and respectively received by the first and second ultrasonic sensors, the processor respectively calculates distances from the first and second ultrasonic sensors to the object and determines the touch point of the object based on the calculated distances.

3. The touch screen apparatus of claim 1, wherein the processor separates an ultrasonic signal, which is reflected from another object except the first object, among the plurality of objects, from an ultrasonic signal received by the first ultrasonic sensor to extract an ultrasonic signal reflected from the first object, extracts the ultrasonic signal reflected from the first object from the ultrasonic signal received by the second ultrasonic sensor by using a ToF of the ultrasonic signal that has been transmitted from the first ultrasonic sensor, refracted from the first object, and received by the second ultrasonic sensor, and determines a touch point of the first object based on the extracted ultrasonic signals.

4. The touch screen apparatus of claim 3, further comprising:
a storage configured to store a plurality of reflected waveforms of ultrasonic signals, each reflected waveform corresponding to a distance,
wherein the processor compares waveforms of the extracted ultrasonic signals with the stored reflected waveforms to respectively determine distances from the first and second ultrasonic sensors to the first object and determine the touch point of the first object based on the determined distances.

5. The touch screen apparatus of claim 1, wherein in response receiving an overlapped signal which the ultrasonic signals reflected from each of a first object and a second object of the plurality of objects are overlapped, the processor determines ToFs of the ultrasonic signals respectively reflected from the first and second objects by using at least one of a size of an overlap area where the ultrasonic signals respectively reflected from the first and second objects overlap each other on a waveform of the overlapping ultrasonic signal, and a phase difference between the ultrasonic signals.

6. The touch screen apparatus of claim 5, further comprising:
a storage configured to store reflected waveforms depending on at least one of the size of the overlap area and the phase difference in an ultrasonic signal where the ultrasonic signals respectively reflected from the first and second objects overlap each other,
wherein the processor extracts a reflected waveform corresponding to at least one of a peak value and a slope value of the overlapping ultrasonic signal from a candidate group of reflected waveforms corresponding to at least one of the overlap area where the ultrasonic signals respectively reflected from the first and second objects overlap each other and the phase difference, and the processor determines at least one of the size of the overlap area where the ultrasonic signals respectively reflected from the first and second objects overlap each other and the phase difference, based on the extracted reflected waveform.

7. The touch screen apparatus of claim 1, wherein the processor calculates ToFs of the received ultrasonic signals to detect outer dots of the object and estimates a size and a shape of the object from the detected outer dots.

8. The touch screen apparatus of claim 7, wherein the processor calculates a time that is a time during which an ultrasonic signal is transmitted from a first ultrasonic sensor, refracted from the object, and received by a second ultrasonic sensor, to detect an additional outer dot of the object.

9. The touch screen apparatus of claim 1, further comprising:
a reflector apparatus configured to be provided at an outer part of the display, the reflector apparatus having a paraboloid surface that reflects or refracts a portion of the ultrasonic signals transmitted from the plurality of ultrasonic sensors in a direction substantially parallel to the display.

10. The touch screen apparatus of claim 9, further comprising:
an ultrasonic signal absorbing material configured to absorb at least a portion of other ultrasonic signals except the ultrasonic signals that are reflected or refracted in the direction substantially parallel to the display.

11. A method of controlling a touch screen apparatus, the method comprising:
transmitting ultrasonic signals from a plurality of ultrasonic sensors;
receiving the ultrasonic signals reflected from an object touched on the display by the plurality of ultrasonic sensors; and
determining a touch point of the object based on ToFs of the received ultrasonic signals,
wherein the plurality of ultrasonic sensors include a first ultrasonic sensor and a second ultrasonic sensor, and
wherein determining comprises determining touch points of a plurality of objects touched on the display based on a ToF of a ultrasonic signal which is transmitted from the first ultrasonic sensor, reflected by the plurality of objects and received by the first ultrasonic sensor, a ToF of an ultrasonic signal which is transmitted from the second ultrasonic sensor, reflected by the plurality of objects and received by the second ultrasonic sensor, and a ToF of an ultrasonic signal which is transmitted from the first ultrasonic sensor, refracted by the plurality of objects and received by the second ultrasonic sensor.

12. The method of claim 11, wherein the receiving of the ultrasonic signals comprises:
respectively transmitting the ultrasonic signals from the first and second ultrasonic sensors of the plurality of ultrasonic sensors, and receiving the ultrasonic signals reflected from the object, through the first and second ultrasonic sensors,
wherein the determining of the touch point of the object comprises:
respectively calculating distances from the first and second ultrasonic sensors to the object based on ToFs of the received ultrasonic signals; and
determining the touch point of the object based on the calculated distances.

13. The method of claim 11, wherein the determining of the touch point of the first object comprises:
separating an ultrasonic signal, which is reflected from another object other than the first object, from the ultrasonic signal received by the first ultrasonic sensor to extract an ultrasonic signal reflected from the first object, and extracting the ultrasonic signal, which is reflected from the first object, from an ultrasonic signal received by the second ultrasonic sensor by using a ToF of the ultrasonic signal that has been transmitted from the first ultrasonic sensor, refracted from a first object, and received by the second ultrasonic sensor; and
determining the touch point of the first object based on the extracted ultrasonic signals.

14. The method of claim 13, further comprising:

storing reflected waveforms of ultrasonic signals, each reflective waveform corresponding to a distance, wherein the determining of the touch point of the first object comprises:

comparing waveforms of the extracted ultrasonic signals with the stored reflected waveforms to respectively determine distances from the first and second ultrasonic sensors to the first object; and determining the touch point of the first object based on the determined distances.

15. A touch screen apparatus comprising:

a display;

a first ultrasonic sensor configured to transmit a first ultrasonic signal;

a second ultrasonic sensor configured to transmit a second ultrasonic signal; and a processor configured to, in response to receiving the first ultrasonic signal reflected from an object touched on the display by the first ultrasonic sensor, and the second ultrasonic signal reflected from the object touched on the display by the second ultrasonic sensor, determine a touch point of the object based on Time of Flights (ToFs) of the received first and second ultrasonic signals, wherein the processor determines touch points of a plurality of objects touched on the display based on a ToF of the first ultrasonic signal reflected by the plurality of objects and received by the first ultrasonic sensor, a ToF of the second ultrasonic signal reflected by the plurality of objects and received by the second ultrasonic sensor, and a ToF of the first ultrasonic signal refracted by the plurality of objects and received by the second ultrasonic sensor.

16. The touch screen apparatus of claim 15, wherein the processor calculates a first distance from the first ultrasonic sensor to the object, and a second distance from the second ultrasonic sensor to the object, and determines the touch point of the object based on the calculated first and second distances.

17. The touch screen apparatus of claim 15, wherein the processor separates an ultrasonic signal, which is reflected from the second object, from an ultrasonic signal received by the first ultrasonic sensor to extract the first ultrasonic signal reflected from the first object, extracts an ultrasonic signal reflected from the first object from an ultrasonic signal received by the second ultrasonic sensor by using a ToF of the third ultrasonic signal, and determines a touch point of the first object based on the extracted ultrasonic signals.

* * * * *